(12) United States Patent
Saripella et al.

(10) Patent No.: US 11,674,451 B2
(45) Date of Patent: Jun. 13, 2023

(54) METHODS AND APPARATUS TO DETECT AIR FLOW SEPARATION OF AN ENGINE

(71) Applicant: General Electric Company, Schenectady, NY (US)

(72) Inventors: Sai Venkata Karthik Saripella, Bengaluru (IN); Vishnu Vardhan Venkata Tatiparthi, Bengaluru (IN); Keith Blodgett, Milford, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/729,263

(22) Filed: Apr. 26, 2022

(65) Prior Publication Data

US 2022/0412271 A1  Dec. 29, 2022

Related U.S. Application Data

(63) Continuation of application No. 16/860,853, filed on Apr. 28, 2020, now Pat. No. 11,333,079.

(51) Int. Cl.
*F02C 9/16* (2006.01)
*B64D 33/02* (2006.01)
*F02C 7/04* (2006.01)
*F02C 7/06* (2006.01)
*F02K 3/06* (2006.01)

(52) U.S. Cl.
CPC ............... *F02C 9/16* (2013.01); *B64D 33/02* (2013.01); *F02C 7/04* (2013.01); *F02C 7/06* (2013.01); *F02K 3/06* (2013.01); *B64D 2033/0286* (2013.01); *F05D 2220/323* (2013.01); *F05D 2220/36* (2013.01); *F05D 2240/50* (2013.01); *F05D 2270/02* (2013.01);
(Continued)

(58) Field of Classification Search
CPC .. F02C 7/045; F02C 7/057; F02C 6/08; F02C 9/16; B64D 2033/0226; B64D 2033/0286; B64D 33/02; F05D 2270/17; F05D 2270/0311; F05D 2270/0315; F02K 3/04; F02K 3/06; F15D 1/002; F15D 1/0065; F15D 1/008
See application file for complete search history.

(56) References Cited

U.S. PATENT DOCUMENTS 3,572,960 A * 3/1971 McBride ............... F04D 29/684
415/209.1
4,199,295 A  4/1980 Raffy et al.
(Continued)

FOREIGN PATENT DOCUMENTS

EP  3002414 A2  4/2016

*Primary Examiner* — Alain Chau
(74) *Attorney, Agent, or Firm* — McGarry Bair PC

(57) ABSTRACT

A turbine engine including a fan, a nacelle circumscribing at least the fan, a compressor section downstream of the fan, and a conduit defined, at least in part, by the nacelle. The conduit includes a first opening at the compressor section, a second opening downstream of the fan and upstream of the compressor section, and a third opening upstream of the fan. Pressure sensors coupled to the nacelle are communicatively coupled to at least one actuator. The at least one actuator can adjust airflow between the first opening and the second opening, or between the first opening and the third opening. The pressure sensors can provide outputs for generating commands that control the at least one actuator.

20 Claims, 14 Drawing Sheets

(52) U.S. Cl.
CPC ............... *F05D 2270/3011* (2013.01); *F05D 2270/3015* (2013.01); *F05D 2270/334* (2013.01); *F05D 2270/807* (2013.01)

(56) References Cited

U.S. PATENT DOCUMENTS

| | | | | |
|---|---|---|---|---|
| 4,255,083 | A * | 3/1981 | Andre | G10K 11/1787 |
| | | | | 415/119 |
| 4,419,045 | A * | 12/1983 | Andre | G10K 11/1787 |
| | | | | 415/181 |
| 5,370,340 | A | 12/1994 | Pla | |
| 5,431,533 | A | 7/1995 | Hobbs | |
| 5,448,881 | A | 9/1995 | Patterson et al. | |
| 5,732,547 | A | 3/1998 | Olsen et al. | |
| 5,833,433 | A * | 11/1998 | May | F02C 7/045 |
| | | | | 415/115 |
| 6,055,805 | A * | 5/2000 | El-Aini | F01D 5/145 |
| | | | | 415/117 |
| 6,334,753 | B1 | 1/2002 | Tillman et al. | |
| 6,546,734 | B2 * | 4/2003 | Antoine | F02C 7/045 |
| | | | | 415/119 |
| 7,631,483 | B2 * | 12/2009 | Mani | F02C 7/045 |
| | | | | 60/785 |
| 7,708,230 | B2 | 5/2010 | Cloft et al. | |
| 7,739,865 | B2 | 6/2010 | Prasad et al. | |
| 7,870,721 | B2 | 1/2011 | Winter et al. | |
| 8,192,147 | B2 * | 6/2012 | Haas | B64D 33/02 |
| | | | | 415/144 |
| 8,209,953 | B2 | 7/2012 | Winter et al. | |
| 8,402,739 | B2 | 3/2013 | Jain et al. | |
| 8,640,986 | B2 | 2/2014 | Surply et al. | |
| 8,657,567 | B2 | 2/2014 | Cloft et al. | |
| 8,931,252 | B2 | 1/2015 | Richardson et al. | |
| 9,157,368 | B2 | 10/2015 | Hurwitz et al. | |
| 9,334,807 | B2 * | 5/2016 | deGaribody | G01S 17/02 |
| 9,995,217 | B2 | 6/2018 | DiBendetto | |
| 10,073,002 | B2 | 9/2018 | Prince | |
| 10,145,387 | B2 | 12/2018 | Knight et al. | |
| 11,027,827 | B2 | 6/2021 | Sidelkovskiy | |
| 2005/0274103 | A1 | 12/2005 | Prasad et al. | |
| 2008/0112799 | A1 * | 5/2008 | Winter | F02C 7/047 |
| | | | | 415/145 |
| 2008/0296440 | A1 | 12/2008 | Cloft et al. | |
| 2008/0298950 | A1 | 12/2008 | Cloft et al. | |
| 2009/0000272 | A1 * | 1/2009 | Cloft | F02C 9/18 |
| | | | | 60/226.1 |
| 2009/0060704 | A1 | 3/2009 | Hurwitz et al. | |
| 2009/0155046 | A1 * | 6/2009 | Haas | B64D 33/02 |
| | | | | 415/58.4 |
| 2011/0072828 | A1 | 3/2011 | Winter et al. | |
| 2013/0263601 | A1 * | 10/2013 | Richardson | F02C 7/047 |
| | | | | 60/722 |
| 2013/0266419 | A1 | 10/2013 | Richardson et al. | |
| 2015/0030446 | A1 | 1/2015 | Gonidec et al. | |
| 2015/0330310 | A1 | 11/2015 | deGaribody | |
| 2018/0045176 | A1 | 2/2018 | Church | |
| 2018/0119640 | A1 | 5/2018 | Howe | |
| 2018/0201387 | A1 | 7/2018 | Porte et al. | |
| 2018/0209345 | A1 | 7/2018 | Fulayter et al. | |
| 2019/0264615 | A1 * | 8/2019 | Husband | F02C 7/262 |
| 2020/0070962 | A1 | 3/2020 | Sidelkovskiy | |
| 2020/0080477 | A1 | 3/2020 | Murphy | |
| 2020/0386107 | A1 | 12/2020 | Hoisington et al. | |

* cited by examiner

INLET FLOW SEPARATION (IFS) SEVERITY LEVEL TABLE

| INLET FLOW SEPARATION (IFS) SEVERITY LEVEL PARAMETER | DEFINITION / DETERMINATION LOGIC | WEIGHT FACTORS | MODELS: PROBABILITY DENSITY FUNCTION (PDF) OF NO IFS | MODELS: PDFS OF IFS BASED ON SEVERITY LEVEL |
|---|---|---|---|---|
| FLOW DIRECTION 702 | ΔP(Ps-Pt) AT NACELLE OUTER LIP(S) | wtFD 708 | 714 | 716 — MEAN SHIFT |
| NACELLE INLET PRESSURE DIFFERENCE 704 | ΔP(Psouter-Psinner) AT NACELLE | wtDP 710 | | 718 — MEAN SHIFT & STD DEV VARIATION |
| ENGINE VIBRATORY RESPONSE 706 | ACCELERATION DATA FROM BEARING ACCELEROMETER(S) | wtEVR 712 | | |

METHODS AND APPARATUS TO DETECT AIR FLOW SEPARATION OF AN ENGINE

CROSS REFERENCE TO RELATED APPLICATION

This application is a continuation of and claims priority to U.S. application Ser. No. 16/860,853, filed Apr. 28, 2020, now U.S. Pat. No. 11,333,079, issued May 17, 2022, the contents of which is incorporated herein by reference.

FIELD OF THE DISCLOSURE

This disclosure relates generally to a gas turbine engine and, more particularly, to methods and apparatus to detect air flow separation of an engine.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the compressor section includes, in serial flow order, a low pressure compressor ("LP compressor") and a high pressure compressor ("HP compressor"). The LP compressor and the HP compressor may include one or more axially spaced apart stages. Each stage may include a row of circumferentially spaced apart stator vanes and a row of circumferentially spaced apart rotor blades positioned downstream of the row of stator vanes. The stator vanes direct the air flowing through the compressor section onto the rotor blades, which impart kinetic energy into the air to increase the pressure thereof.

Intakes of gas turbine engines are subject to cross winds and high incidence cross flows during takeoff, when in flight, etc., which can affect the stability of air to the rotor blades. During such flight conditions, airflow at an inlet of the gas turbine engine can separate to cause inlet flow separation and reduce performance of the gas turbine engine.

SUMMARY

Methods and apparatus to control air flow separation of an engine are disclosed herein.

An example apparatus disclosed herein includes hardware, and memory including instructions that, when executed, cause the hardware to at least determine an inlet flow separation parameter based on a first pressure value from a first pressure sensor included in a nacelle of a turbofan and a second pressure value from a second pressure sensor included in the nacelle, determine a severity level parameter based on the inlet flow separation parameter, the severity level parameter based on a difference between the first pressure value and the second pressure value, and adjust a contribution of airflow from aft of a fan of the turbofan based on the severity level parameter.

Another example apparatus disclosed herein includes an inlet flow separation parameter determiner to determine an inlet flow separation parameter based on a first pressure value from a first pressure sensor included in a nacelle of a turbofan and a second pressure value from a second pressure sensor included in the nacelle, an inlet flow separation severity level parameter determiner to determine a severity level parameter based on the inlet flow separation parameter, the severity level parameter based on a difference between the first pressure value and the second pressure value, and a command generator to adjust a contribution of airflow from aft of a fan of the turbofan based on the severity level parameter.

An example non-transitory computer readable storage medium disclosed herein includes instructions that, when executed, cause at least one processor to at least determine an inlet flow separation parameter based on a first pressure value from a first pressure sensor included in a nacelle of a turbofan and a second pressure value from a second pressure sensor included in the nacelle, determine a severity level parameter based on the inlet flow separation parameter, the severity level parameter based on a difference between the first pressure value and the second pressure value, and adjust a contribution of airflow from aft of a fan of the turbofan based on the severity level parameter.

An example method disclosed herein includes determining an inlet flow separation parameter based on a first pressure value from a first pressure sensor included in a nacelle of a turbofan and a second pressure value from a second pressure sensor included in the nacelle, determining a severity level parameter based on the inlet flow separation parameter, the severity level parameter based on a difference between the first pressure value and the second pressure value, and adjusting a contribution of airflow from aft of a fan of the turbofan based on the severity level parameter.

Yet another example apparatus disclosed herein includes hardware, and memory including instructions that, when executed, cause the hardware to at least determine an inlet flow separation parameter based on a first pressure value from a first pressure sensor included in a nacelle of a turbofan and a second pressure value from a second pressure sensor included in the nacelle, and determine a severity level parameter based on the inlet flow separation parameter, the severity level parameter based on a difference between the first pressure value and the second pressure value.

BRIEF DESCRIPTION OF THE DRAWINGS

FIG. 7 is a table depicting example determinations used to detect inlet flow separation for the high-bypass turbofan-type gas turbine engines of FIGS. 3-5.

The figures are not to scale. In general, the same reference numbers will be used throughout the drawing(s) and accompanying written description to refer to the same or like parts.

DETAILED DESCRIPTION

Figure 1:
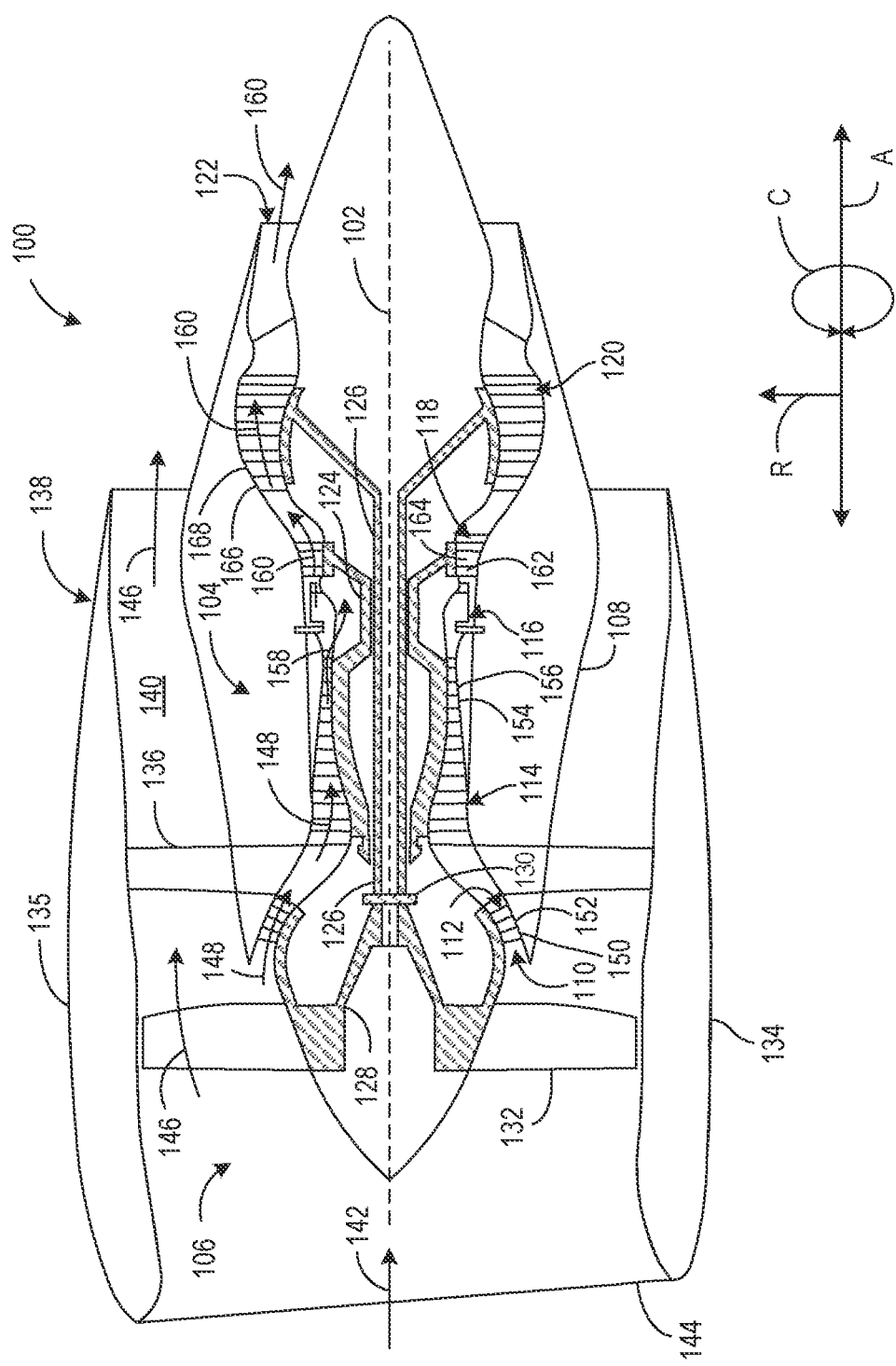
FIG. 1 is a schematic cross-sectional view of a first example high-bypass turbofan-type gas turbine engine.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

Performance of gas turbine engines used on aircraft (e.g., commercial aircraft) varies during different flight conditions experienced by the aircraft. In some instances, adverse flight conditions can reduce gas turbine engine performance. Such adverse flight conditions can include takeoff of the aircraft or a cross-wind condition of the aircraft when in flight. An inlet lip section located at the foremost end of the nacelle of the engine is typically designed to enable operation of the engine to prevent a separation of airflow from the inlet lip section of the nacelle during the adverse flight conditions. As used herein, the separation of airflow from the inlet lip section of the nacelle is referred to as "inlet flow separation" or "inlet airflow separation" and are used interchangeably. For example, the inlet lip section may require a "thick" inlet lip section design to support operation of the engine during specific flight conditions, such as cross-wind conditions, take-off, etc.

In some instances, inlet flow separation can cause significant asymmetry in the total pressure within the intake of the engine. In such instances, the asymmetrical total pressure can cause asymmetrical loading of fan blades of a fan of the engine, which can increase stresses of the fan blades. In some such instances, the stresses of the fan blades may result in reduced reliability and/or operating lifetime of the fan blades and/or, more generally, the engine. Some severe instances of inlet flow separation may cause compressor or engine surge, which is an increase in revolutions-per-minute (rpm) of a compressor of the engine. For instance, severe inlet flow separation may cause the compressor and/or, more generally, the engine to stall.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one example can be used with another example to yield a still further example. Thus, it is intended that the present disclosure covers such modifications and variations as come within the scope of the appended claims and their equivalents.

Examples disclosed herein detect and control airflow separation of an engine, such as a gas turbine engine. In some disclosed examples, an inlet flow separation (IFS) controller determines one or more severity level parameters, or IFS severity level parameters, that can be used to detect IFS. For example, the IFS controller can determine a first IFS severity level parameter based on an airflow direction, a second IFS severity level parameter based on a pressure difference across inlet sections of a nacelle of the engine, and/or a third IFS severity level parameter based on an engine vibratory response. In such examples, the IFS controller can determine the first IFS severity level parameter and/or the second IFS severity level parameter based on air pressure data from air pressure sensors included in an inlet lip section of the nacelle, an outlet lip section of the nacelle, etc. In some such examples, the IFS controller can determine the third IFS severity level parameter based on acceleration data obtained from one or more acceleration sensors monitoring one or more bearings (e.g., ball bearings, roller bearings, etc.) of the engine.

In some disclosed examples, the IFS controller can determine an IFS severity level, or a degree or quantification of the IFS (if any), at the inlet of the engine based on the IFS severity level parameter(s). For example, the IFS controller can determine a probability density function based on the IFS severity level parameter(s). In such examples, the IFS controller can detect IFS at the inlet of the engine by comparing the probability density function to one or more stored probability density functions that can correspond to characterizations or representations of the engine in diverse flight conditions.

In some disclosed examples, in response to detecting IFS, the IFS controller can control one or more actuators included in the nacelle of the engine to reduce and/or otherwise eliminate the detected IFS. For example, the IFS controller can control an actuator to adjust (1) a first airflow contribution from a first region aft of a fan of the engine and/or a second airflow contribution from a second region of a core of the engine to (2) a third region forward of the fan. In such examples, the IFS controller can reduce and/or otherwise eliminate the IFS by adjusting the airflow contribution of at least one of the first region or the second region. Advantageously, examples disclosed herein can reduce and/or otherwise eliminate IFS and, thus, improve the reliability and operating lifetime of the engine by adjusting the airflow contributions from at least one of the first region or the second region to the third region.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Referring now to the drawings, wherein identical numerals indicate the same elements throughout the figures, FIG. 1 is a schematic cross-sectional view of a first example high-bypass turbofan-type gas turbine engine 100 ("turbofan 100") as may incorporate various examples disclosed herein. As shown in FIG. 1, the first turbofan 100 defines a longitudinal or axial centerline axis 102 extending therethrough for reference. In general, the first turbofan 100 can include a core turbine or gas turbine engine 104 disposed downstream from a fan section 106.

The core turbine engine 104 can generally include a substantially tubular outer casing 108 that defines an annular inlet 110. The outer casing 108 can be formed from a single casing or multiple casings. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gear 130 (i.e., an indirect-drive or geared-drive configuration).

As shown in FIG. 1, the fan section 106 includes a plurality of fan blades 132 ("fan" 132) coupled to and extending radially outwardly from the fan shaft 128. A first annular fan casing or first nacelle 134 circumferentially encloses the fan section 106 and/or at least a portion of the core turbine 104. The first turbofan 100 includes a second nacelle 135 opposite the first nacelle 134. The nacelles 134, 135 can be supported relative to the core turbine 104 by a plurality of circumferentially-spaced apart outlet guide vanes 136. Furthermore, a downstream section 138 of the nacelles 134, 135 can enclose an outer portion of the core turbine 104 to define a bypass airflow passage 140 therebetween.

As illustrated in FIG. 1, air 142 enters an intake or inlet portion 144 of the first turbofan 100 during operation thereof. A first portion 146 of the air 142 flows into the bypass flow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the first turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelles 134, 135. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the first turbofan 100 defines an axial direction A, a radial direction R, and a circumferential direction C. In general, the axial direction A extends generally parallel to the axial centerline axis 102, the radial direction R extends orthogonally outwardly from the axial centerline axis 102, and the circumferential direction C extends concentrically around the axial centerline axis 102.

Figure 2:
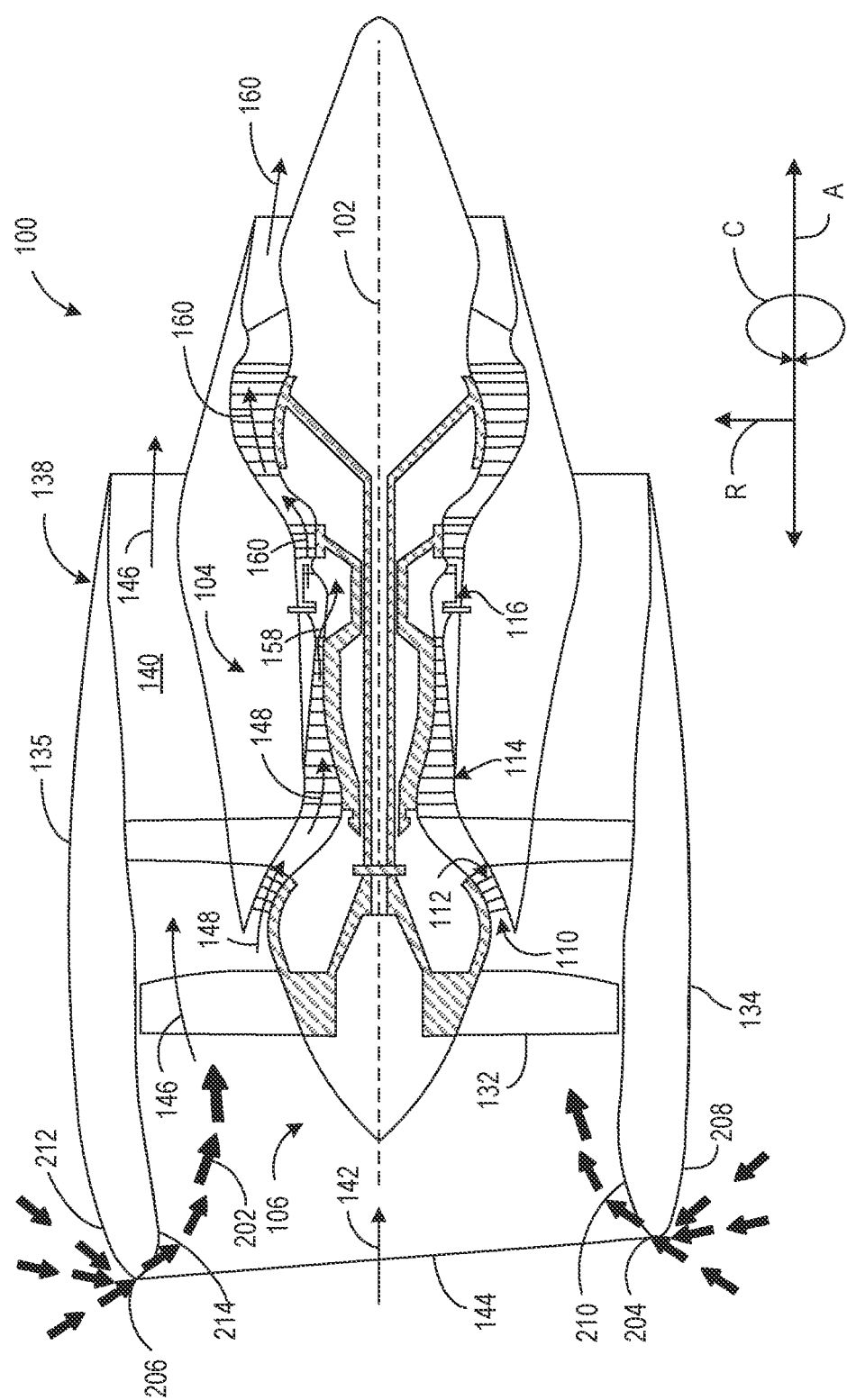
FIG. 2 is a schematic cross-sectional view of the first example high-bypass turbofan-type gas turbine engine of FIG. 1 during an inlet flow separation event.

FIG. 2 is a schematic cross-sectional view of the first high-bypass turbofan-type gas turbine engine 100 of FIG. 1 during an inlet flow separation (IFS) event. In FIG. 2, the IFS event is represented by example arrows 202 moving towards a middle or mid-section of the fan section 106 of FIG. 1 and/or, more generally, towards the axial centerline axis 102 of FIG. 1. For example, the arrows 202 can be representative of the air 142 separating at inlet sections (e.g., nacelle inlet sections) 204, 206 of the nacelles 134, 135 of FIG. 1. In such examples, the IFS event can cause asymmetries in pressure (e.g., air pressure) experience by the fan blades 132 of FIG. 1 and/or portion(s) of the fan section 106.

In FIG. 2, the IFS event can be caused by an example adverse flight condition. For example, the first turbofan 100 can be coupled to an aircraft, and the IFS event can be caused in response to takeoff of the aircraft. In other examples, the first turbofan 100 can be coupled to an aircraft, and the IFD event can be caused in response to a cross-wind (e.g., a cross-wind condition, a cross-wind event, etc.) when the aircraft is in flight.

In FIG. 2, the nacelle inlet sections 204, 206 include a first nacelle inlet section 204 and a second nacelle inlet section 206. In FIG. 2, the first nacelle inlet section 204 has a first outer lip (e.g., a first outer lip surface, a first outer lip section, etc.) 208 and a first inner lip (e.g., a first inner lip surface, a first inner lip section, etc.) 210. In FIG. 2, the second nacelle inlet section 206 has a second outer lip (e.g., a second outer lip surface, a second outer lip section, etc.) 212 and a second inner lip (e.g., a second inner lip surface, a second inner lip section, etc.) 214.

In some examples, the fan blades 132 experience stresses (e.g., mechanical stresses, vibration stresses, etc.) in response to the IFS event. In response to the stresses, one(s) of the fan blades 132 can structurally degrade, deteriorate, weaken, etc., over time and can cause a reduction in reliability and/or operating lifetime of the fan blades 132. For example, one(s) of the fan blades 132 can be damaged in response to the IFS event.

In some examples, the IFS event can cause significant asymmetries in the pressure at the inlet portion 144 of FIG. 1, which can cause compressor or engine surge. For example, at least one of the LP compressor 112 or the HP compressor 114 can experience compressor surge in response to the IFS event. In such examples, the compressor surge can cause at least one of the LP compressor 112 or the HP compressor 114 to stall and/or, more generally, can cause the core turbine 104 of FIGS. 1-2 to stall.

Figure 3:
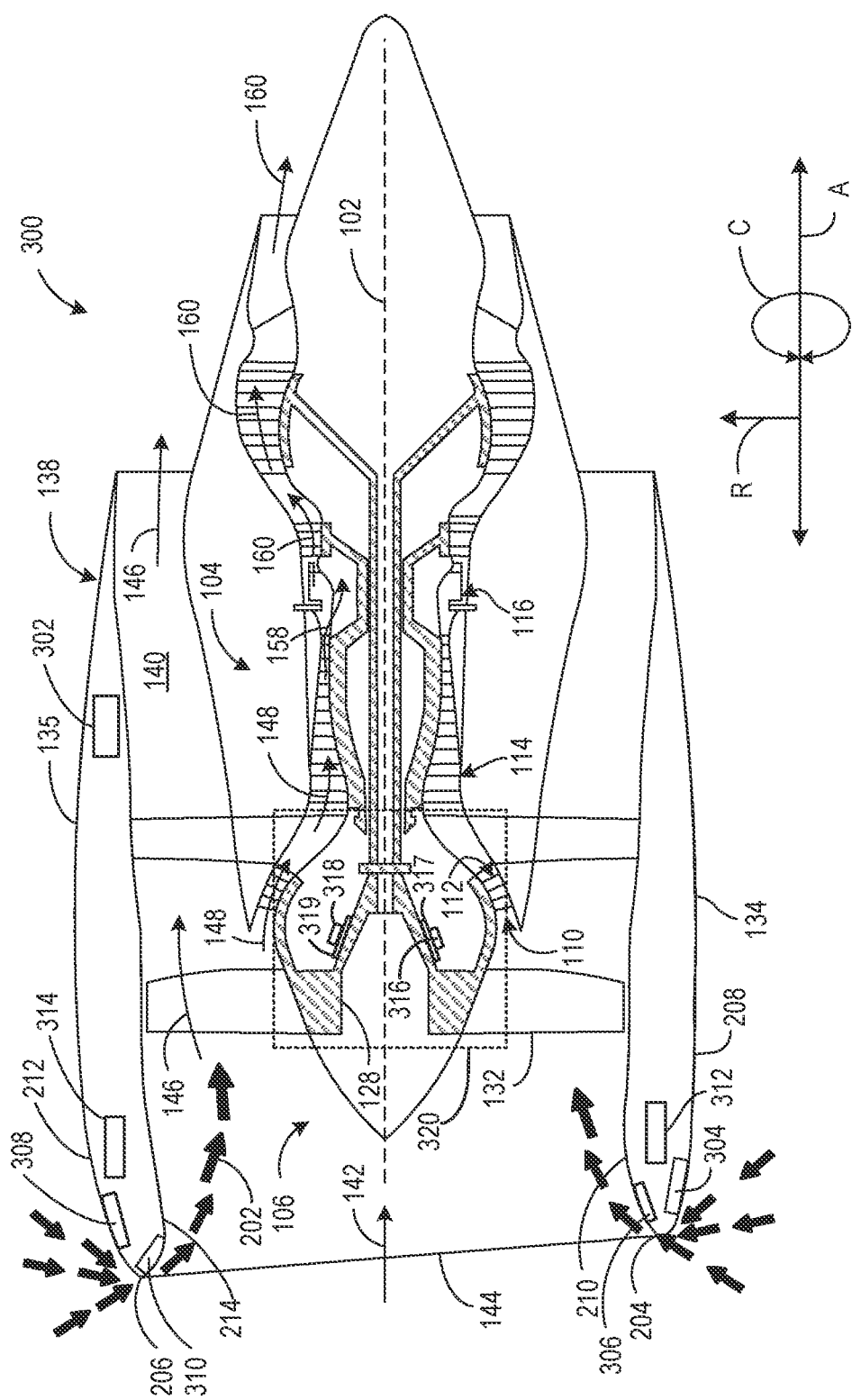
FIG. 3 is a schematic cross-sectional view of a second example high-bypass turbofan-type gas turbine engine including an example controller monitoring inlet flow separation using example pressure sensors.

FIG. 3 is a schematic cross-sectional view of a second example high-bypass turbofan-type gas turbine engine 300 including an example controller (e.g., an IFS controller) 302 monitoring inlet flow separation using example pressure sensors 304, 306, 308, 310. The second turbofan 300 can be an example implementation of the first turbofan 100 of FIGS. 1-2. For example, the second turbofan 300 can include all of the components of the first turbofan 100 of FIG. 1, such as the gas turbine engine 104, the tubular outer casing 108, the LP compressor 112, the HP compressor 114, etc., of FIGS. 1-2. In such examples, the description in connection with the first turbofan 100 of FIGS. 1-2 can be applicable to the second turbofan 300 of FIG. 3.

In FIG. 3, the IFS controller 302 is a full-authority digital engine control (FADEC) unit. Alternatively, the IFS controller 302 may be an engine control unit (ECU), an electronic engine control (EEC) unit, etc., or any other type of data acquisition and/or control computing device, processor platform (e.g., processor-based computing platform), etc. In FIG. 3, the IFS controller 302 is included in the second nacelle 135. Alternatively, the IFS controller 302 may be included at any other location of the second turbofan 300, such as the first nacelle 134.

In FIG. 3, the pressure sensors 304, 306, 308, 310 include a first example pressure sensor 304, a second example pressure sensor 306, a third example pressure sensor 308, and a fourth example pressure sensor 310. In FIG. 3, the first pressure sensor 304 is coupled to the first outer lip 208 of the first nacelle 134. In FIG. 3, the second pressure sensor 306 is coupled to the first inner lip 210 of the first nacelle 134. The first pressure sensor 304 is configured to measure a first air pressure at the first outer lip 208. During an IFS event, such as the IFS event depicted in FIGS. 2-3, the first air pressure can approximate a stagnation pressure. The second pressure sensor 306 is configured to measure a second air pressure at the first inner lip 210. In FIG. 3, the second air pressure can approximate a static pressure.

In FIG. 3, the third pressure sensor 308 is coupled to the second outer lip 212 of the second nacelle 135. In FIG. 3, the fourth pressure sensor 310 is coupled to the second inner lip 214 of the second nacelle 135. The third pressure sensor 308 is configured to measure a third air pressure at the second outer lip 212. During an IFS event, such as the IFS event depicted in FIGS. 2-3, the third air pressure can approximate a stagnation pressure. The fourth pressure sensor 310 is configured to measure a fourth air pressure at the second inner lip 214. In FIG. 3, the fourth air pressure can approximate a static pressure.

In FIG. 3, the first pressure sensor 304, the second pressure sensor 306, the third pressure sensor 308, and the fourth pressure sensor 310 are wireless sensors (e.g., wireless pressure sensors, wireless piezoelectric pressure sensors, wireless passive piezoelectric pressure sensors, etc.). For example, the first pressure sensor 304, the second pressure sensor 306, the third pressure sensor 308, and the fourth pressure sensor 310 can be wireless passive piezoelectric pressure sensors. Alternatively, one or more of the first pressure sensor 304, the second pressure sensor 306, the third pressure sensor 308, and/or the fourth pressure sensor 310 may be wired pressure sensors (e.g., wired pressure sensors, wired piezoelectric pressure sensors, wired passive piezoelectric pressure sensors, etc.). Alternatively, one or more of the first pressure sensor 304, the second pressure sensor 306, the third pressure sensor 308, and/or the fourth pressure sensor 310 may be a different type of sensor, such as a diaphragm pressure sensor, a pitot tube, etc.

In FIG. 3, the first pressure sensor 304 and the second pressure sensor 306 are communicatively coupled to a first example antenna (e.g., an antenna module) 312. In FIG. 3, the third pressure sensor 308 and the fourth pressure sensor 310 are communicatively coupled to a second example antenna 314. In FIG. 3, the first antenna 312 is included in the first nacelle 134 and the second antenna 314 is included in the second nacelle 135. Alternatively, both antennae 312, 314 may be included in the first nacelle 134 while, in other examples, both antennae 312, 314 can be included in the second nacelle 135.

In FIG. 3, the first antenna 312 and the second antenna 314 are coupled (e.g., communicatively coupled, electrically coupled, etc.) to the IFS controller 302 via a wired connection (not shown). Alternatively, one or both antennae 312, 314 may be coupled to the IFS controller 302 via a wireless connection. In example operation, the first pressure sensor 304 and the second pressure sensor 306 can transmit pressure data (e.g., air pressure data, air pressure measurements, etc.) to the IFS controller 302 via the first antenna 312. In example operation, the third pressure sensor 308 and the fourth pressure sensor 310 can transmit pressure data (e.g., air pressure data, air pressure measurements, etc.) to the IFS controller 302 via the second antenna 314.

In FIG. 3, the turbofan 300 includes example acceleration sensors 316, 318 in an example bearing section 320. In FIG. 3, the bearing section 320 includes, corresponds to, and/or otherwise is representative of example bearings 317, 319 (e.g., ball bearings, roller bearings, etc.) to support the fan shaft 128. In FIG. 3, the acceleration sensors 316, 318 are coupled to the bearing section 320 (e.g., coupled to the one or more bearings 317, 319 included in the bearing section 320) to monitor and/or otherwise measure forces (e.g., acceleration forces, vibration forces, etc.) experienced by the bearings.

In FIG. 3, the acceleration sensors 316, 318 include a first example acceleration sensor 316 and a second example acceleration sensor 318. In FIG. 3, the acceleration sensors 316, 318 are accelerometers. For example, one or more of the acceleration sensors 316, 318 can be a vibration sensor (e.g., a vibration sensor that includes a piezoelectric crystal element), a gyroscope sensor, or a velocity sensor. In FIG. 3, the first acceleration sensor 316 is coupled to a first side of the fan shaft 128. In FIG. 3, the first acceleration sensor 316 is coupled to a first example bearing 317 of the bearings 317, 319 included in the bearing section 320. In FIG. 3, the second acceleration sensor 318 is coupled to a second side of the fan shaft 128, where the second side is on the opposite side of the axial centerline axis 102. In FIG. 3, the second acceleration sensor 318 is coupled to a second example bearing 319 of the bearings 317, 319 included in the bearing section 320.

Figure 4A:
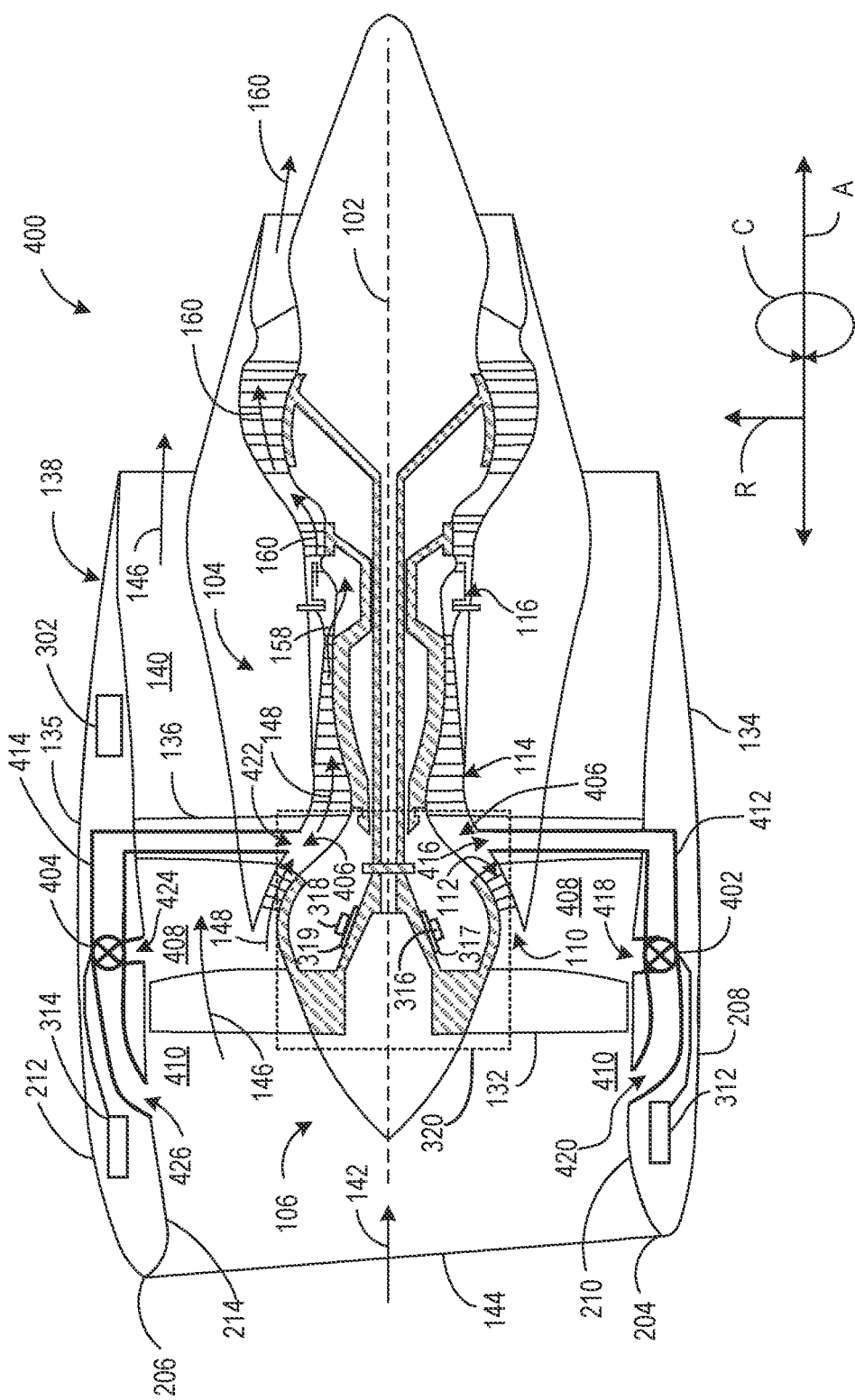
FIG. 4A is a schematic cross-sectional view of a third example high-bypass turbofan-type gas turbine engine including the example controller of FIG. 3 and example actuators to adjust contributions of airflow to an inlet section of the third high-bypass turbofan-type gas turbine engine.

FIG. 4A is a schematic cross-sectional view of a third example high-bypass turbofan-type gas turbine engine 400 including the IFS controller 302 and the antennae 312, 314 of FIG. 3. Alternatively, the third turbofan 400 may not include one or both antennae 312, 314. The third turbofan 400 can be an example implementation of the first turbofan 100 of FIGS. 1-2 or portion(s) thereof and/or the second turbofan 300 of FIG. 3 or portion(s) thereof. For example, the third turbofan 400 can include one or more of the components of the first turbofan 100 of FIGS. 1-2 and/or the second turbofan 300 of FIG. 3, such as the gas turbine engine 104, the tubular outer casing 108, the LP compressor 112, the HP compressor 114, etc., of FIGS. 1-3, the IFS controller 302, the antennae 312, 314 of FIG. 3, etc., and/or a combination thereof. In such examples, the description in connection with the first turbofan 100 of FIGS. 1-2 and/or the description in connection with the second turbofan 300 of FIG. 3 can be applicable to the third turbofan 400 of FIG. 4A.

In FIG. 4A, the third turbofan 400 includes example actuators 402, 404 to adjust contributions of airflow from at least one of a first example section (e.g., a first airflow section, a first airflow contribution section, a first airflow portion, a first airflow region, a first airflow zone, etc.) 406 or a second example section (e.g., a second airflow section, a second airflow contribution section, a second airflow portion, a second airflow region, a second airflow zone, etc.) 408 to a third example section (e.g., a third airflow section, a third airflow contribution section, a third airflow portion, a third airflow region, a third airflow zone, etc.) 410. In FIG. 4A, the actuators 402, 404 include a first example actuator 402 included in the first nacelle 134 and a second example actuator 404 included in the second nacelle 135.

In FIG. 4A, the first section 406 corresponds to an airflow section between the LP compressor 112 and the HP compressor 114 and can be generally referred to herein as "the core." In FIG. 4A, the second section 408 can correspond to an airflow section aft of the fan blades 132 and forward the outlet guide vanes 136. In FIG. 4A, the third section 410 can correspond to an airflow section forward the fan blades 132. For example, the third section 410 can include, correspond to, and/or otherwise be representative of the fan section 106.

In FIG. 4A, the airflow sections 406, 408, 410 are fluidly coupled and/or otherwise connected via example conduits (e.g., airflow conduits, bleed passages, bleed passageways, etc.) 412, 414. For example, airflow from the first section 406 and/or the second airflow section 408 can be directed, routed, etc., to the third airflow section 410 via the conduits 412, 414 The conduits 412, 414 include a first example conduit 412 included in the first nacelle 134 and a second example conduit 414 included in the second nacelle 135. In FIG. 4A, the conduits 412, 414 are composed and/or otherwise constructed from the same material(s) as the nacelles 134, 135. For example, the conduits 412, 414 can be constructed from one or more composite materials, one or more metallic materials, etc., and/or a combination thereof.

In FIG. 4A, the first conduit 412 has a first opening (e.g., a first conduit opening) 416, a second opening 418 (e.g., a second conduit opening), and a third opening (e.g., a third conduit opening) 420. The first opening 416 of the first conduit 412 is a first inlet (e.g., a first conduit inlet) coupled to the first section 406. The first opening 416 of the first conduit 412 is configured to obtain airflow (e.g., pressurized airflow) from the first section 406. The second opening 418 of the first conduit 412 is a second inlet (e.g., a second conduit inlet) coupled to the second section 408. The second opening 418 of the first conduit 412 is configured to obtain airflow (e.g., ambient airflow, non-pressurized airflow, incoming airflow, etc.) from the second section 408. The third opening 420 of the first conduit 412 is an outlet (e.g., a conduit outlet) coupled to the third section 410. The third opening 420 of the first conduit 412 is configured to expel and/or otherwise output airflow to the third section 410.

In FIG. 4A, the second conduit 414 has a first opening (e.g., a first conduit opening) 422, a second opening 424 (e.g., a second conduit opening), and a third opening (e.g., a third conduit opening) 426. The first opening 422 of the second conduit 414 is a first inlet (e.g., a first conduit inlet) coupled to the first section 406. The first opening 422 of the second conduit 414 is configured to obtain airflow from the first section 406. The second opening 424 of the second conduit 414 is a second inlet (e.g., a second conduit inlet) coupled to the second section 408. The second opening 424 of the second conduit 414 is configured to obtain airflow from the second section 408. The third opening 426 of the second conduit 414 is an outlet (e.g., a conduit outlet) coupled to the third section 410. The third opening 420 of the second conduit 414 is configured to expel and/or otherwise output airflow to the third section 410.

In FIG. 4A, airflow (e.g., bleed airflow) from the conduits 412, 414 are expelled, introduced, etc., into the third section 410 in a direction opposite a direction of the air 142 (e.g., the oncoming air 142 at the inlet portion 144). The bleed airflow introduced into the third section 410 from the conduits 412, 414 force the air 142 to flow around the bleed airflow. Advantageously, the bleed airflow introduced to the third section 410 simulates and/or otherwise performs as a "thick" nacelle lip to reduce and/or otherwise eliminate IFS at the inlet portion 144.

In FIG. 4A, the airflow from the conduits 412, 414 can be obtained from the first section 406 and/or the second section 408 and, thus, can be delivered to the third section 410 at relatively high pressure. The airflow from the conduits 412, 414 are introduced to the third section 410 at an angle relative to the air 142. Alternatively, the airflow from the conduits 412, 414 may be introduced to the third section 410 at any angle based on a design of the nacelles 134, 135 and/or, more generally, the third turbofan 400.

In FIG. 4A, the actuators 402, 404 are valves actuated and/or otherwise controlled by solenoids. Alternatively, the actuators 402, 404 may be any other type of actuator. The actuators 402, 404 are operative in at least three positions including a first position, a second position, and a third position. The first position, the second position, and the third position can correspond to an amount of opening of the actuator 402, 404 to the different sections 406, 408, 410. For example, the actuators 402, 404 in the first position can direct a high quantity of air from the first section 406 to the third section 410 and a low quantity of air from the second section 408 to the third section 410. In such examples, the first position can correspond to the actuators 402, 404 being 70%, 80%, 90%, etc., open to the first section 406 and 30%, 20%, 10%, etc., open to the second section 408.

In other examples, the actuators 402, 404 in the second position can direct a medium quantity of air from the first section 406 to the third section 410 and a medium quantity of air from the second section 408 to the third section 410. In such examples, the second position can correspond to the actuators 402, 404 being 45%, 50%, 55%, etc., open to the first section 406 and 55%, 50%, 45%, etc., open to the second section 408.

In yet other examples, the actuators 402, 404 in the third position can direct a low quantity of air from the first section 406 to the third section 410 and a high quantity of air from the second section 408 to the third section 410. In such examples, the third position can correspond to the actuators 402, 404 being 10%, 20%, 30%, etc., open to the first section 406 and 90%, 80%, 70%, etc., open to the second section 408. For example, the low quantity of air is less than the medium quantity of air, and the medium quantity of air is less than the high quantity of air.

In FIG. 4A, the first antenna 312 is coupled to the first actuator 402 and the second antenna 314 is coupled to the second actuator 404 via wired connections. Alternatively, the first antenna 312 may be coupled to the first actuator 402 via a first wireless connection and/or the second antenna 314 may be coupled to the second actuator 404 via a second wireless connection. For example, the IFS controller 302 of FIG. 3 can transmit a wireless command, direction, instruction, etc., to one(s) of the antennae 312, 314 to control one(s) of the actuators 402, 404 to change positions. By invoking the actuators 402, 404 to change positions, airflow contributions from at least one of the first section 406 or the second section 408 can be adjusted to the third section 410. Advantageously, by adjusting the airflow contributions to the first section 406, the IFS controller 302 can reduce and/or otherwise eliminate IFS in response to an adverse flight condition of the third turbofan 400. Advantageously, the IFS controller 302 can reduce and/or otherwise eliminate IFS by delivering pressurized airflow (e.g., airflow from the first section 406), ambient airflow (e.g., airflow from the second section 408), etc., and/or a combination thereof, to the third section 410. For example, in response to a first severity level of detected IFS, the IFS controller 302 can deliver a first portion of ambient air from the second section 408 to the third section 410. In such examples, in response to a second severity level of detected IFS greater than the first severity level of detected IFS (e.g., the second severity level is representative of greater or more severe IFS than that of the first severity level), the IFS controller 302 can deliver (1) a second portion of ambient air from the second section 408 to the third section 410 and/or (2) a third portion of pressurized air from the first section 406 to the third section 410. In some such examples, the second portion of ambient air can be less than and/or otherwise different from the first portion of ambient air.

Figure 4B:
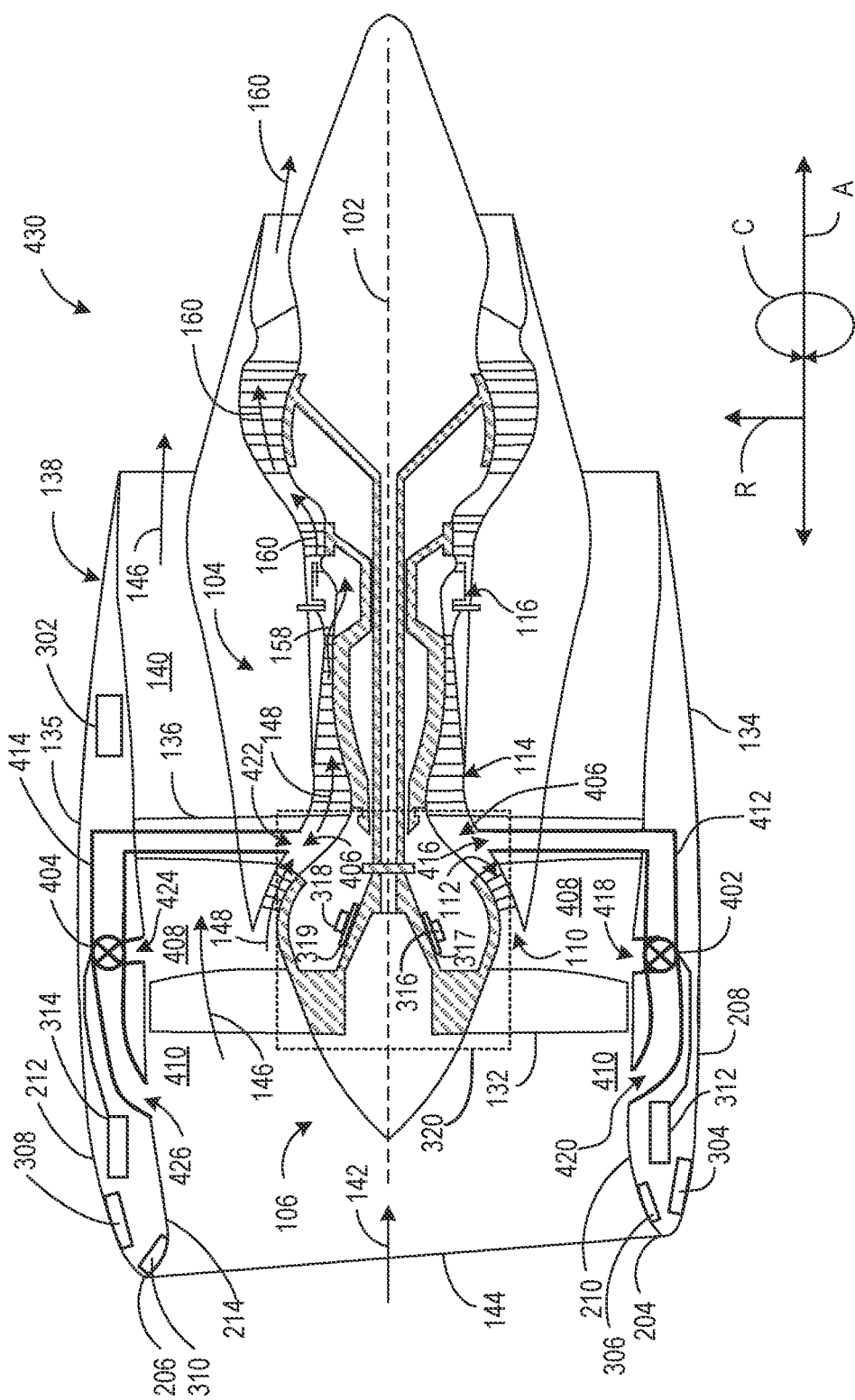
FIG. 4B is a schematic cross-sectional view of a fourth example high-bypass turbofan-type gas turbine engine including the example controller and example pressure sensors of FIG. 3 and example actuators to adjust contributions of airflow to an inlet section of the fourth high-bypass turbofan-type gas turbine engine.

FIG. 4B is a schematic cross-sectional view of a fourth example high-bypass turbofan-type gas turbine engine 430 including the IFS controller 302 of FIGS. 3-4A, the pressure sensors 304, 306, 308, 310 of FIG. 3, and the antennae 312, 314 of FIGS. 3-4A. The fourth turbofan 430 can be an example implementation of the first turbofan 100 of FIGS. 1-2 or portion(s) thereof, the second turbofan 300 of FIG. 3 or portion(s) thereof, and/or the third turbofan 400 of FIG. 4A or portion(s) thereof. For example, the fourth turbofan 430 can include one or more of the components of the first turbofan 100 of FIGS. 1-2, the second turbofan 300 of FIG. 3, and/or the third turbofan 400 of FIG. 4A, such as the gas turbine engine 104, the tubular outer casing 108, the LP compressor 112, the HP compressor 114, etc., of FIGS. 1-3, the IFS controller 302, the pressure sensors 304, 306, 308, 310, the antennae 312, 314 of FIG. 3, etc., and/or a combination thereof. In such examples, the description in connection with the first turbofan 100 of FIGS. 1-2, the description in connection with the second turbofan 300 of FIG. 3, and/or the description in connection with the third turbofan 400 of FIG. 4A can be applicable to the fourth turbofan 430 of FIG. 4B.

In FIG. 4B, the IFS controller 302, the first pressure sensor 304, and the second pressure sensor 306 are in communication with and/or otherwise communicatively coupled to the first antenna 312 via wireless connection(s). In FIG. 4B, the first actuator 402 is in communication with and/or otherwise communicatively coupled to the first antenna 312 via wired connection(s). Alternatively, the first actuator 402 may be in communication with and/or otherwise communicatively coupled to the first antenna 312 via wireless connection(s).

In FIG. 4B, the IFS controller 302, the third pressure sensor 308, and the fourth pressure sensor 310 are in communication with and/or otherwise communicatively coupled to the second antenna 314 via wireless connection(s). In FIG. 4B, the second actuator 404 is in communication with and/or otherwise communicatively coupled to the second antenna 314 via wired connection(s). Alternatively, the second actuator 404 may be in communication with and/or otherwise communicatively coupled to the second antenna 314 via wireless connection(s).

In FIG. 4B, the fourth turbofan 430 includes the IFS controller 302 to detect IFS at the inlet portion 144 based on pressure measurements from at least one of the first pressure sensor 304, the second pressure sensor 306, the third pressure sensor 308, or the fourth pressure sensor 310. In FIG. 4B, the IFS controller 302 can obtain pressure measurements from one(s) of the pressure sensors 304, 306, 308, 310 via respective one(s) of the antennae 312, 314. In FIG. 4B, the IFS controller 302 can control one(s) of the actuators 402, 404 based on the IFS detection. For example, the IFS controller 302 can generate command(s) and transmit the command(s) to the first actuator 402 and/or the second actuator 404. In such examples, in response to obtaining the command(s), the first actuator 402 can move from a first position to a second position, the second actuator 404 can move from a third position to a fourth position, etc. In some such examples, the movement(s) of the first actuator 402 and/or the second actuator 404 can adjust airflow contribution(s) from at least one of the first section 406 or the second section 408 to the third section 410.

Figure 5:
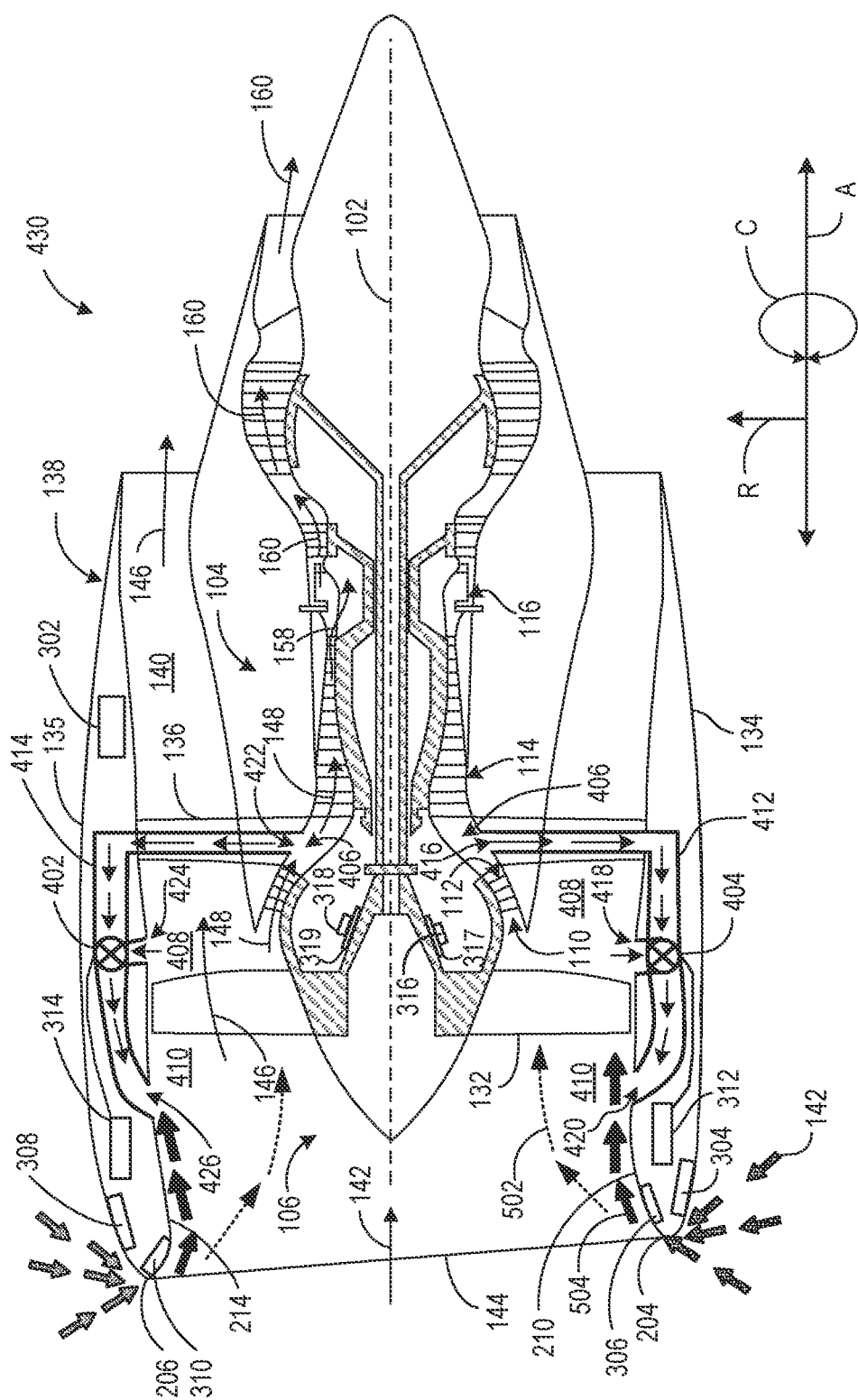
FIG. 5 is a schematic cross-sectional view of the fourth example high-bypass turbofan-type gas turbine engine of FIG. 4B during an inlet flow separation event.

FIG. 5 is a schematic cross-sectional view of the fourth high-bypass turbofan-type gas turbine engine 430 of FIG. 4B during an inlet flow separation event. In FIG. 5, two different airflows 502, 504 are depicted including a first airflow 502 and a second airflow 504. The first airflow 502 corresponds to separation of the air 142 incident to the nacelle inlet sections 204, 206, which causes the air 142 to move towards the axial centerline axis 102. The first airflow 502 can cause compressor or engine surge, an increased engine vibratory response, etc., and/or a combination thereof that can cause a reduction in reliability and/or operating lifetime of the fan blades 132 or any other component of the third turbofan 400.

In FIG. 5, the second airflow 504 corresponds to an example where separation of the air 142 incident to the nacelle inlet sections 204, 206 does not occur and/or otherwise is minimized. For example, the second airflow 504 can correspond to the IFS event represented by the arrows 202 of FIG. 2. In FIG. 5, the second airflow 504 flows along the inner lips 210, 214 of the third turbofan 400. For example, in response to the IFS controller 302 detecting the first airflow 502 (e.g., detecting an IFS event), the IFS controller 302 can control one(s) of the actuator(s) 402, 404 of FIGS. 4A and/or 4B to bleed airflow from at least one of the first section 406 or the second section 408 to the third section 410. Advantageously, the IFS controller 302 can adjust the first airflow 502 to the second airflow 504 in response to adjusting airflow contributions from at least one of the first section 406 or the second section 408 to the third section 410.

Figure 6:
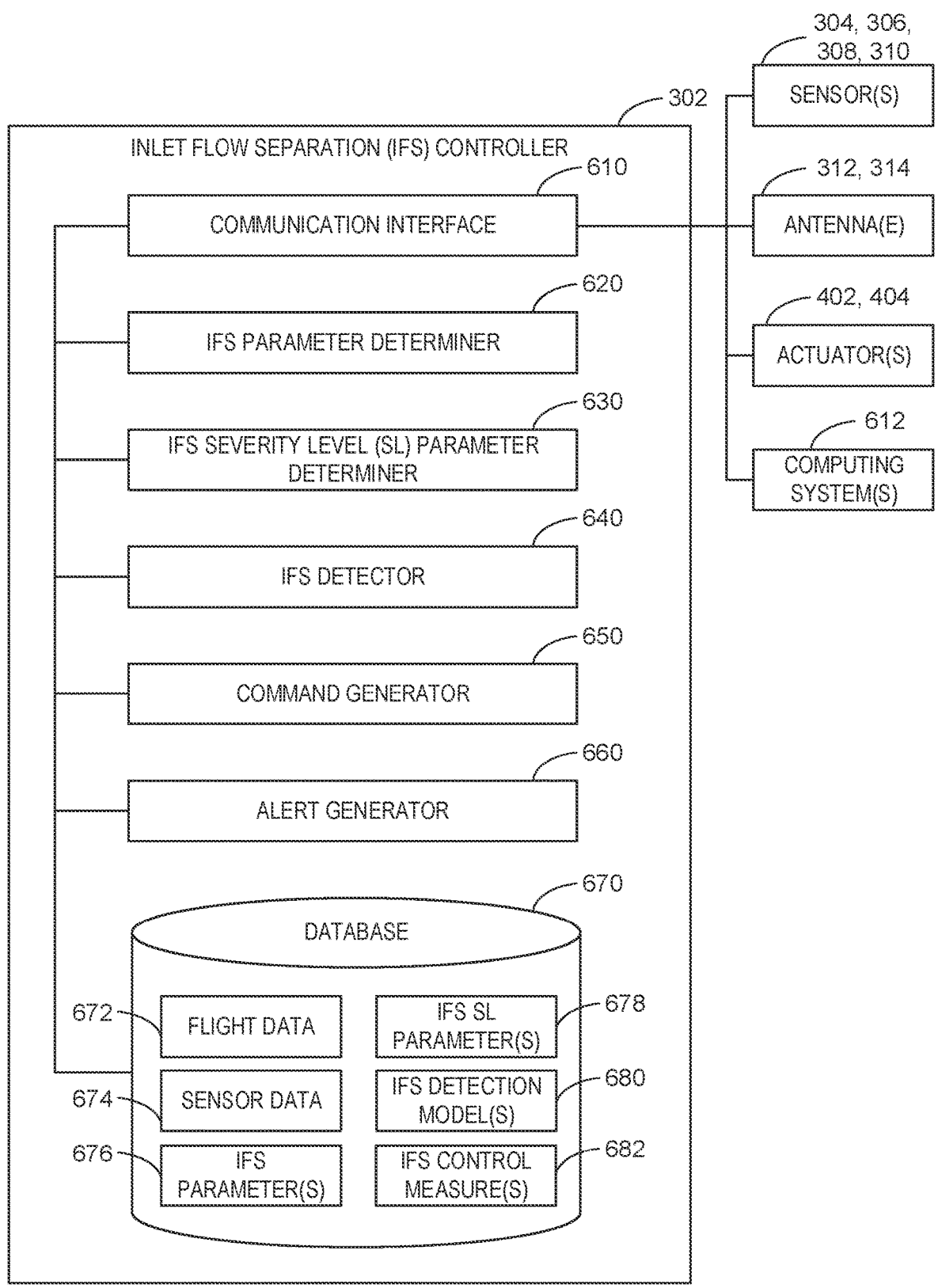
FIG. 6 is a block diagram of an implementation of the example controller for use with the high-bypass turbofan-type gas turbine engines of FIGS. 3-5.

FIG. 6 is a block diagram of an implementation of the IFS controller 302 of FIGS. 3-5. The IFS controller 302 is configured to detect and/or control IFS at the inlet 144 of the turbofans 300, 400, 430 of FIGS. 3-5. In response to the detection of the IFS, the IFS controller 302 is configured to control one(s) of the actuator(s) 402, 404 of FIGS. 4-5 to control contributions of airflow from at least one of the core (e.g., the first section 406 of FIGS. 4-5) or aft of the fan 132 (e.g., the second section 408 of FIGS. 4-5) to forward of the fan 132 to reduce and/or otherwise eliminate the IFS.

In FIG. 6, the implementation of the IFS controller 302 includes an example communication interface 610, an example inlet flow separation parameter determiner 620, an example inlet flow separation severity level parameter determiner 630, an example inlet flow separation detector 640, an example command generator 650, an example alert generator 660, and an example database 670. In FIG. 6, the database 670 includes example flight data 672, example sensor data 674, example IFS parameter(s) 676, example IFS severity level parameter(s) 678, example IFS detection model(s) 680, and example IFS control measure(s) 682.

In the illustrated example of FIG. 6, the IFS controller 302 includes the communication interface 610 to communicate with sensor(s) (e.g., the first pressure sensor 304, the second pressure sensor 306, the third pressure sensor 308, the fourth pressure sensor 310, the first acceleration sensor 316, and/or the second acceleration sensor 318 of FIGS. 3-5), an antenna (e.g., the first antenna 312 and/or the second antenna 314 of FIGS. 3-5), actuator(s) (e.g., the first actuator 402 and/or the second actuator 404 of FIGS. 4-5), and/or example computing system(s) 612. For example, the computing system(s) 612 can correspond to one or more processor-based platforms associated with an aircraft, one or more processor-based platforms associated with an aircraft or turbofan manufacturer, etc. In some examples, the communication interface 610 obtains data or information from one or more of the sensor(s) 304, 306, 308, 310, the antennae 312, 314, the actuator(s) 402, 404, and/or the computing system(s) 612 via a wired connection, a wireless connection, etc., and/or a combination thereof.

In some examples, the communication interface 610 obtains the flight data 672 from a computing system (e.g., the computing system(s) 612) onboard an aircraft. For example, the communication interface 610 can obtain altitude data, speed data (e.g., airspeed data), etc., associated with the turbofans 300, 400, 430 of FIGS. 3-5 and/or, more generally, the aircraft to which the turbofans 300, 400, 430 are coupled. In such examples, the communication interface 610 can store the altitude data, the speed data, etc., in the database 670 as the flight data 672.

In some examples, the communication interface 610 obtains an IFS command from the computing system(s) 612. For example, the communication interface 610 can obtain an IFS command from an aircraft coupled to the third turbofan 400 of FIG. 4A, a pilot controlling the aircraft from a cockpit of the aircraft, etc. In such examples, the IFS command can be to increase an airflow contribution from the first section 406 or the second section 408 to the third section 410. In other examples, the IFS command can be to decrease an airflow contribution from the first section 406 or the second section 408 to the third section 410.

In some examples, the communication interface 610 transmits an alert, data, information, etc., to the computing system onboard the aircraft. For example, the communication interface 610 can transmit an alert to an aircraft control system to display the alert on a user interface of a display in a cockpit for presentation to a pilot. In such examples, the alert can include data, information, etc., as described below in connection with the alert generator 660.

In some examples, the communication interface 610 obtains sensor data from one(s) of the sensors 304, 306, 308, 310 of FIGS. 3-5. For example, the communication interface 610 can obtain pressure data (e.g., air pressure data) from the first pressure sensor 304 and the second pressure sensor 306 via the first antenna 312. In other examples, the communication interface 610 can obtain pressure data (e.g., air pressure data) from the third pressure sensor 308 and the fourth pressure sensor 310 via the second antenna 314.

In some examples, the communication interface 610 transmits a command, a direction, an instruction, etc., to one(s) of the actuators 402, 404. For example, the communication interface 610 can deliver a command via a wired connection to the actuators 402, 404 to adjust from a first position to a second position. In other examples, the communication interface 610 can transmit a command to the first actuator 402 to adjust from a first position to a second position via the first antenna 312. In yet other examples, the communication interface 610 can transmit a command to the second actuator 404 to adjust from the first position to the second position via the second antenna 314.

In FIG. 6, the IFS controller 302 includes the IFS parameter determiner 620 to determine the IFS parameter(s) 676 based on sensor data associated with a turbofan and store the IFS parameter(s) 676 in the database 670. The IFS parameter(s) 676 can correspond to processed data values used by the IFS controller 302 to detect an IFS event and/or determine a quantification or severity of the IFS event. For example, the IFS parameter determiner 620 can determine one or more IFS parameters 676 associated with the turbofans 300, 400, 430 of FIGS. 3-5 including a first air pressure value at the first outer lip 208, a second air pressure value at the first inner lip 210, a third air pressure value at the second outer lip 212, a fourth air pressure value at the second inner lip 214, an air density, a Mach number, and/or a bearing load.

In some examples, the IFS parameter determiner 620 determines the first air pressure value based on first air pressure data from the first pressure sensor 304 of FIGS. 3-5. The IFS parameter determiner 620 can determine the second air pressure value based on second air pressure data from the second pressure sensor 306 of FIGS. 3-5. The IFS parameter determiner 620 can determine the third air pressure value based on third air pressure data from the third pressure sensor 308 of FIGS. 3-5. The IFS parameter determiner 620 can determine the fourth air pressure value based on fourth air pressure data from the fourth pressure sensor 310 of FIGS. 3-5.

In some examples, the IFS parameter determiner 620 determines an air density based on the altitude data. For example, the IFS parameter determiner 620 can determine an air density of the air 142 of FIGS. 1-5 by mapping an altitude of the turbofans 300, 400, 430, the aircraft coupled to the turbofans 300, 400, 430, etc., stored in the flight data 672 to the air density. In such examples, an altitude-to-air density mapping can be stored in a look-up table (e.g., a look-up table in the database 670).

In some examples, the IFS parameter determiner 620 determines a Mach number based on the speed data. For example, the IFS parameter determiner 620 can obtain the speed data from the flight data 672 and determine the Mach number based on the obtained speed data.

In some examples, the IFS parameter determiner 620 determines a bearing load, a force value, a vibration response, etc., and/or a combination thereof based on acceleration data. For example, the communication interface 610 can obtain acceleration data from one(s) of the acceleration sensors 316, 318 coupled to one(s) of the bearings 317, 319 of the bearing section 320 of the engine 104 of FIGS. 3-5. The IFS parameter determiner 620 can determine a first bearing load, a first force value, a first vibration response, etc., associated with the first bearing 317 based on first acceleration data obtained from the first acceleration sensor 316. The IFS parameter determiner 620 can determine a second bearing load, a second force value, a second vibration response, etc., associated with the second bearing 319 based on second acceleration data obtained from the second acceleration sensor 318.

In FIG. 6, the IFS controller 302 includes the IFS severity level parameter determiner 630 to determine severity level parameters, such as the IFS severity level parameter(s) 678, based on the IFS parameter(s) 676. The IFS severity level parameter determiner 630 can store the IFS severity level parameter(s) 678 in the database 670. The IFS severity level parameter(s) 678 can correspond to processed data values used by the IFS controller 302 to determine a quantification or severity of the IFS event. For example, the IFS severity level parameter determiner 630 can determine one or more IFS severity level parameters 678 associated with the turbofans 300, 400, 430 of FIGS. 3-5 including a first example severity level parameter 702 (FIG. 7) based on an air flow direction, a second example severity level parameter 704 (FIG. 7) based on a pressure difference outer nacelle pressure(s) and inner nacelle pressure(s), and/or a third example severity level parameter 706 (FIG. 7) based on an engine vibratory response.

Turning to FIG. 7, an example IFS severity level table 700 depicts example determinations by the IFS controller 302 of FIGS. 3-6 used to detect IFS of the turbofans 300, 400, 430 of FIGS. 3-5. The IFS severity level table 700 is representative of example logic that can be used by the IFS controller 302 to determine the first IFS severity level parameter 702, the second IFS severity level parameter 704, and the third IFS severity level parameter 706. Alternatively, the IFS controller 302 may determine fewer or more severity level parameters than depicted in FIG. 7.

In FIG. 7, the first IFS severity level parameter 702 is indicative of a flow direction (e.g., an adverse flow direction, an adverse airflow direction, etc.). For example, the IFS severity level parameter determiner 630 of FIG. 6 can determine the flow direction based on a difference between Ps (e.g., a first pressure value from the first pressure sensor 304, a second pressure value from the third pressure sensor 308, etc.) and Pt (e.g., a pressure threshold), where Pt can be a pre-defined or pre-determined pressure value. In such examples, Ps corresponds to a pressure value at a nacelle outer lip, such as the first outer lip 208 (e.g., a pressure value or measurement from the first pressure sensor 304), the second outer lip 212 (e.g., a pressure value or measurement from the third pressure sensor 308), etc. In response to determining that the difference satisfies a threshold, such as the difference being less than 0 (e.g., Ps<Pt) or a different value, the IFS severity level parameter determiner 630 can determine that the flow direction is substantially parallel (e.g., parallel within a range of −5 to 5 degrees, −2 to 2 degrees, etc.) to the nacelle outer lip.

In some examples, the IFS severity level parameter determiner 630 can determine that the turbofans 300, 400, 430 are experiencing a cross-wind based on the flow direction. For example, the IFS severity level parameter determiner 630 can detect a cross wind based on the difference being approximately 0 (e.g., Ps=Pt, Ps is approximately equal to Pt, etc.), which can be indicative of the flow direction being normal (e.g., 90 degrees to the nacelle outer lip, normal within a range of 85 to 95 degrees to the nacelle outer lip, etc.) and/or otherwise incident to the nacelle outer lip. In such examples, the IFS severity level parameter determiner 630 can determine that the airflow is stagnant, which can be indicative of a cross wind, based on the difference being approximately 0.

In some examples, the second IFS severity level parameter 704 is indicative of a nacelle inlet pressure difference based on a difference between a first pressure value at an outer lip of a nacelle (Psouter) and a second pressure value at an inner lip of the nacelle (Psinner). For example, the IFS severity level parameter determiner 630 can determine the second IFS severity level parameter 704 by determining a difference between a first pressure value at the first outer lip 208 of the first nacelle 134 and a second pressure value at the first inner lip 210 of the first nacelle 134. In such examples, the IFS severity level parameter determiner 630 can determine the second IFS severity level parameter 704 by normalizing the difference to a Mach number (v) and air density (ρ) of ambient air as described below in Equation (1):

$$NACELLE\ INLET\ PRESSURE\ DIFFERENCE = \frac{(Psouter - Psinner)}{\rho \times v^2} \quad \text{Equation (1)}$$

In some examples, the third IFS severity level parameter 706 is indicative of an engine vibratory response based on acceleration data from bearing accelerometers (e.g., the acceleration sensors 316, 318 of FIGS. 3-5). For example, the IFS severity level parameter determiner 630 can determine the third IFS severity level parameter 706 by generating an acoustic or vibration response of a load at a bearing (e.g., the first bearing 317, the second bearing 319, etc.) included in the bearing section 320 of the engine 104 of FIGS. 3-5 based on acceleration data from one(s) of the acceleration sensors 316, 318 coupled to the bearing(s) 317, 319.

In FIG. 7, the IFS severity level parameter determiner 630 can determine the first IFS severity level parameter 702, the second IFS severity level parameter 704, and the third IFS severity level parameter 706 based on example weight factors (e.g., scaling factors) 708, 710, 712. The weight factors 708 include a first example weight factor (wtFD) 708 corresponding to a flow direction weight factor, a second example weight factor (wtDP) 710 corresponding to a differential pressure weight factor, and a third example weight factor (wtEVR) corresponding to an engine vibratory response weight factor. The IFS severity level parameter determiner 630 can use the weight factors to increase or decrease an effect, impact, and/or influence of the respective IFS severity level parameters 702, 704, 706 on the detection of an IFS event and/or a quantification of a severity of the detected IFS event.

In FIG. 7, the IFS severity level parameter determiner 630 can determine the first IFS severity level parameter 702 based on a multiplication and/or other mathematical operation of an output of the definition/determination logic for the flow direction and the first weight factor 708. In FIG. 7, the IFS severity level parameter determiner 630 can determine the second IFS severity level parameter 704 based on a multiplication and/or other mathematical operation of an output of the definition/determination logic for the nacelle inlet pressure difference and the second weight factor 710. In FIG. 7, the IFS severity level parameter determiner 630 can determine the third IFS severity level parameter 706 based on a multiplication and/or other mathematical operation of an output of the definition/determination logic for the engine vibratory response and the third weight factor 712.

Turning back to FIG. 6, the IFS controller 302 includes the IFS detector 640 to detect an IFS condition, event, etc., of the turbofans 300, 400, 430 of FIGS. 3-5 based on the IFS parameter(s) 676. In some examples, the IFS detector 640 detects IFS based on a comparison of an IFS detection model to one(s) of the IFS detection model(s) 680 stored in the database 670. For example, the IFS detector 640 can generate an IFS detection model based on a probability density function (PDF). The IFS detector 640 can generate and/or otherwise determine the PDF based on at least one of the first IFS severity level parameter 702, the second IFS severity level parameter 704, or the third IFS severity level parameter 706. Alternatively, the IFS detection model may be a machine-learning model, such as a neural network (e.g., a convolution neural network, a deep neural network, etc.).

Turning back to FIG. 7, the IFS detector 640 can generate an IFS detection model including a PDF based on the first IFS severity level parameter 702, the second IFS severity level parameter 704, or the third IFS severity level parameter 706. The IFS detector 640 can compare the PDF to a first example PDF 714, a second example PDF 716, and a third example PDF 718. The PDFs 714, 716, 718 can be stored in the database 670 as the IFS detection models 680. In FIG. 7, the first PDF 714 can correspond to a no IFS condition or a clean airflow condition at the inlet 144 of FIGS. 1-5.

In FIG. 7, the second PDF 716 can correspond to a PDF generated based on an adverse inlet flow direction and an impact on inlet airflow oncoming to the fan 132. The IFS detector 640 can determine the adverse inlet flow direction based on the first IFS severity level parameter 702. The IFS detector 640 can determine the impact on the inlet airflow oncoming to the fan 132 based on the second IFS severity level parameter 704. In FIG. 7, the adverse inlet flow direction and the impact on inlet airflow oncoming to the fan 132 can cause a mean shift to the first PDF 714 to generate the second PDF 716.

In FIG. 7, the third PDF 718 can correspond to a PDF generated based on an adverse inlet flow direction, an impact on inlet airflow oncoming to the fan 132, and an adverse engine vibration response. The IFS detector 640 can determine the adverse engine vibration response based on the third IFS severity level parameter 706. In FIG. 7, the adverse inlet flow direction, the impact on inlet airflow oncoming to the fan 132, and the adverse engine vibration response can cause a mean shift and a standard deviation (STD DEV) variation to the first PDF 714 to generate the third PDF 718. In some examples, the IFS detector 640 detects IFS at the inlet 144 of the turbofans 300, 400, 430 based on the comparison(s) of a PDF based on the IFS severity level parameters 702, 704, 706 and the PDFs 714, 716, 718 of FIG. 7.

Turning back to FIG. 6, the IFS controller 302 includes the command generator 650 to generate a command, a direction, an instruction, etc., to control and/or otherwise invoke one(s) of the actuator(s) 402, 404 of FIGS. 4-5. In some examples, the command generator 650 invokes the communication interface 610 to transmit a command to the first antenna 312 to relay the command to the first actuator 402 to move the first actuator 402 from a first position to a second position, where the first position is different from the second position. In some such examples, the command generator 650 can invoke the first actuator 402 to facilitate a high airflow contribution from the first section 406 and a low airflow contribution from the second section 408 to the third section 410.

In some examples, the command generator 650 invokes the communication interface 610 to transmit a command to the second actuator 404 via a wired connection (e.g., without transmitting the command to the second antenna 314). In such examples, the command generator 650 can invoke the second actuator 404 to adjust positions based on the command. In some such examples, the command generator 650 can invoke the second actuator 404 to facilitate a low airflow contribution from the first section 406 and a high airflow contribution from the second section 408 to the third section 410. In other examples, the command generator 650 can invoke the second actuator 404 to facilitate a medium airflow contribution from the first section 406 and a medium airflow contribution from the second section 408 to the third section 410.

In some examples, the command generator 650 determines one(s) of the IFS control measure(s) 682 based on the IFS severity level parameter(s) 678. In FIG. 6, the IFS control measure(s) 682 are command(s), instruction(s), sequence(s) of command(s) or instruction(s), etc., and/or a combination thereof that can be used by the command generator 650 to reduce and/or otherwise eliminate IFS. For example, the command generator 650 can determine not to deploy one of the IFS control measure(s) 682 when the first IFS severity level parameter 702 indicates there is no IFS.

In some examples, the command generator 650 deploys a first one of the IFS control measure(s) 682 based on the IFS severity level parameter(s) 678. For example, the command generator 650 can execute the first one of the IFS control measure(s) 682 by controlling the actuator(s) 402, 404 to facilitate a high core airflow contribution (e.g., a high contribution of airflow from the first section 406) and a low fan airflow contribution (e.g., a low contribution of airflow from the second section 408) when the first IFS severity level parameter 702 and/or the second IFS severity level parameter 704 indicates there is substantially high IFS at the inlet 144. In such examples, the first one of the IFS control measure(s) 682 can include the command generator 650 transmitting a first command to the first actuator 402, a second command to the second actuator 404, a command sequence of transmitting the second command after the first command, etc.

In some examples, the command generator 650 deploys a second one of the IFS control measure(s) 682 based on the IFS severity level parameter(s) 678. For example, the command generator 650 can execute the second one of the IFS control measure(s) 682 by controlling the actuator(s) 402, 404 to facilitate a medium core airflow contribution (e.g., a medium contribution of airflow from the first section 406) and a medium fan airflow contribution (e.g., a medium contribution of airflow from the second section 408) when the first IFS severity level parameter 702 and/or the second IFS severity level parameter 704 indicates there is a medium quantification of IFS at the inlet 144. In such examples, the second one of the IFS control measure(s) 682 can include the command generator 650 transmitting a first command to the first actuator 402, a second command to the second actuator 404, a command sequence of transmitting the second command after the first command, etc.

In some examples, the command generator 650 deploys a third one of the IFS control measure(s) 682 based on the IFS severity level parameter(s) 678. For example, the command generator 650 can execute the third one of the IFS control measure(s) 682 by controlling the actuator(s) 402, 404 to facilitate a low core airflow contribution (e.g., a low contribution of airflow from the first section 406) and a high fan airflow contribution (e.g., a high contribution of airflow from the second section 408) when the first IFS severity level parameter 702 and/or the second IFS severity level parameter 704 indicates there is substantially low IFS at the inlet 144. In such examples, the third one of the IFS control measure(s) 682 can include the command generator 650 transmitting a first command to the first actuator 402, a second command to the second actuator 404, a command sequence of transmitting the second command after the first command, etc.

In FIG. 6, the IFS controller 302 includes the alert generator 660 to generate an alert, alarm, a warning, etc., in response to detecting IFS at the inlet 144 of the turbofans 300, 400, 430 of FIGS. 3-5. In some examples, the alert generator 660 generates an alert by generating a log and/or a report, transmitting the alert to be presented on one or more displays (e.g., one or more displays in a cockpit of an aircraft, on a smartphone, tablet, or laptop display, etc.), transmitting the alert to a network (e.g., an aircraft control network), etc., and/or a combination thereof.

In some examples, the alert generator 660 stores information (e.g., a generated alert, a log, a report, etc.) in the database 670 and/or retrieves information (e.g., the IFS parameter(s) 676, the IFS severity level parameter(s) 678, etc.) from the database 670 to be included in the alert. For example, the alert generator 660 can store a report including a maintenance alert for the fan blades 132 in the database 670 based on an engine vibratory response stored in the IFS severity level parameter(s) 678.

In some examples, the alert generator 660 records and/or otherwise stores the flight data 672 (FIG. 6) and/or the sensor data 674 (FIG. 6) associated with time(s) before, during, and/or after actuation(s) of the first actuator 402 and/or the second actuator 404 in the database 670. In such examples, the alert generator 660 can record which one(s) of the actuators 402, 404 are invoked in response to IFS command(s), position(s) of one(s) of the actuators 402, 404, etc., and/or a combination thereof.

In FIG. 6, the IFS controller 302 includes the database 670 to record and/or otherwise store data, such as the flight data 672, the sensor data 674, the IFS parameter(s) 676, the IFS severity level parameter(s) 678, the IFS detection model(s) 680, and the IFS control measure(s) 682. The database 670 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 670 can additionally or alternatively be implemented by one or more double data rate (DDR) memories, such as DDR, DDR2, DDR3, DDR4, mobile DDR (mDDR), etc. The database 670 can additionally or alternatively be implemented by one or more mass storage devices such as hard disk drive(s), compact disk drive(s), digital versatile disk drive(s), solid-state disk drive(s), etc. While in the illustrated example the database 670 are illustrated as single databases, the database 670 can be implemented by any number and/or type(s) of databases. Furthermore, the data stored in the database 670 can be in any data format such as, for example, binary, comma delimited, hexadecimal, JavaScript Object Notation (JSON), tab delimited, Structured Query Language (SQL), XML, etc.

While an example implementation of the IFS controller 302 of FIGS. 3-5 is illustrated in FIG. 6, one or more of the elements, processes and/or devices illustrated in FIG. 6 can be combined, divided, re-arranged, omitted, eliminated and/or implemented in any other way. Further, the example communication interface 610, the example IFS parameter determiner 620, the example IFS severity level parameter determiner 630, the example IFS detector 640, the example command generator 650, the example alert generator 660, the example database 670 and/or, more generally, the example IFS controller of FIGS. 3-5 may be implemented by hardware, software, firmware and/or any combination of hardware, software and/or firmware. Thus, for example, any of the example communication interface 610, the example IFS parameter determiner 620, the example IFS severity level parameter determiner 630, the example IFS detector 640, the example command generator 650, the example alert generator 660, the example database 670 and/or, more generally, the example IFS controller 302 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 610, the example IFS parameter determiner 620, the example IFS severity level parameter determiner 630, the example IFS detector 640, the example command generator 650, the example alert generator 660, and/or the example database 670 is/are hereby expressly defined to include a non-transitory computer readable storage device or storage disk such as a memory, a digital versatile disk (DVD), a compact disk (CD), a Blu-ray disk, etc. including the software and/or firmware. Further still, the example IFS controller 302 of FIGS. 3-5 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the IFS controller 302 of FIGS. 3-6 are shown in FIGS. 8-12. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 8-12, many other methods of implementing the example IFS controller 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 8:
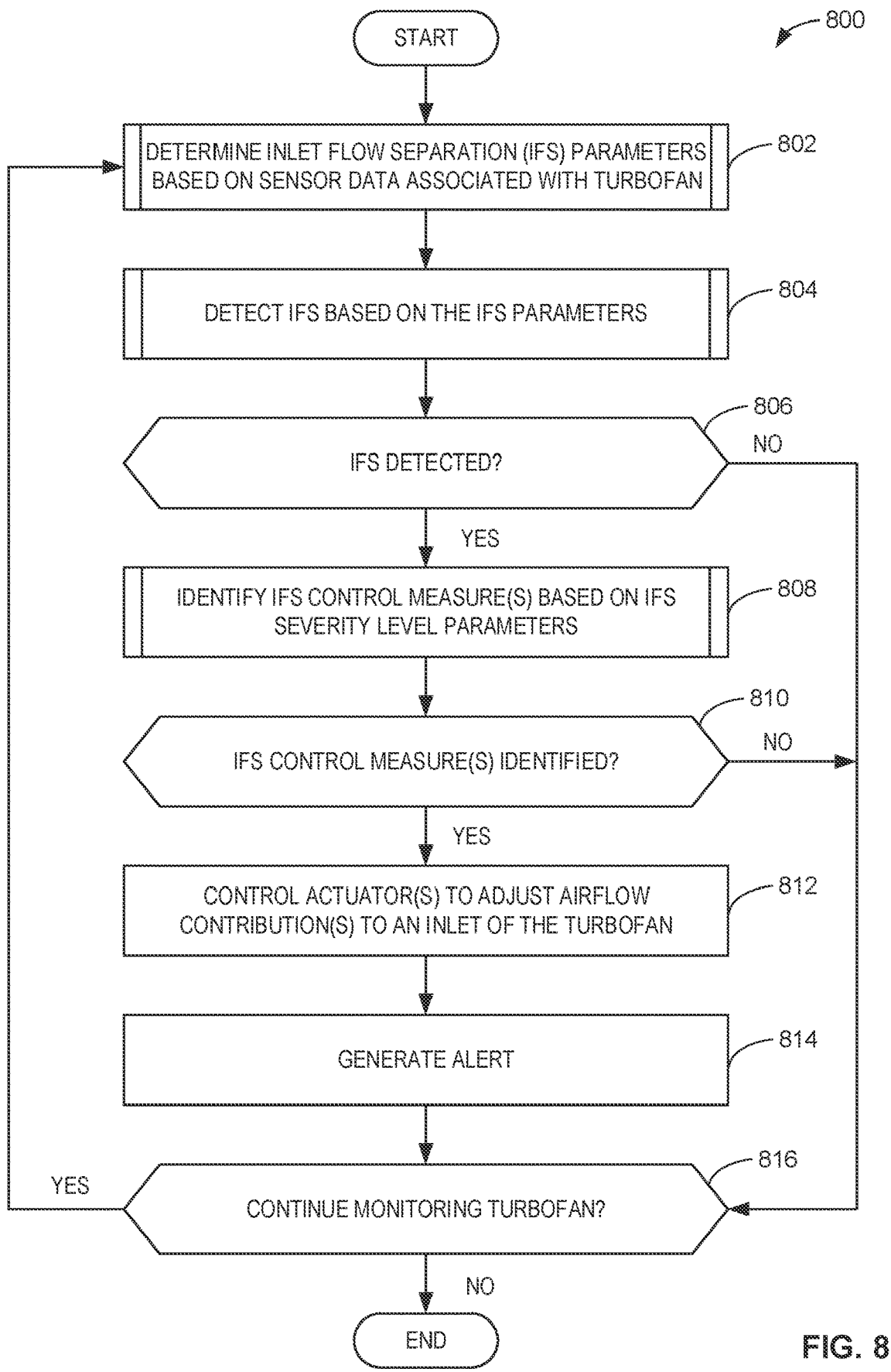
FIG. 8 is a flowchart representative of example machine readable instructions that can be executed to implement the example controller of FIGS. 3-6 to adjust an airflow contribution to an inlet of the high-bypass turbofan-type gas turbine engines of FIGS. 4A-5.

FIG. 8 is a flowchart representative of example machine readable instructions 800 that can be executed to implement the IFS controller 302 of FIGS. 3-6 to adjust an airflow contribution to the inlet 144 of the third turbofan 400 of FIGS. 4-5. The machine readable instructions 800 of FIG. 8 begin at block 802, at which the IFS controller 302 determines inlet flow separation (IFS) parameters based on sensor data associated with a turbofan. For example, the IFS parameter determiner 620 (FIG. 6) can determine one or more of the IFS parameters 676 (FIG. 6) based on the sensor data 674 (FIG. 6) associated with one(s) of the turbofans 300, 400, 430 (FIGS. 3-5). Example instructions that can be executed to implement block 802 are described below in connection with FIG. 9.

At block 804, the IFS controller 302 detects IFS based on the IFS parameters. For example, the IFS detector 640 (FIG. 6) can detect the second airflow 504 of FIG. 5, the IFS event represented by the arrows 202 of FIG. 2, etc., based on the IFS parameter(s) 676, the IFS severity level parameter(s) 678 (FIG. 6), etc., and/or a combination thereof. Example instructions that can be executed to implement block 804 are described below in connection with FIG. 10.

At block 806, the IFS controller 302 determines whether IFS is detected based on the IFS parameters. For example, the IFS detector 640 may not detect IFS based on the IFS parameter(s) 676, the IFS severity level parameter(s) 678, etc., and/or a combination thereof. In other examples, the IFS detector 640 may detect IFS based on the IFS parameter(s) 676, the IFS severity level parameter(s) 678, etc., and/or a combination thereof.

If, at block 806, the IFS controller 302 determines that IFS is not detected, control proceeds to block 816 to determine whether to continue monitoring the turbofan. If, at block 806, the IFS controller 302 determines that IFS is detected, then, at block 808, the IFS controller 302 identifies IFS control measure(s) based on IFS severity level parameters. For example, the IFS severity level parameter determiner 630 (FIG. 6) can determine one(s) of the IFS severity level parameters 678 (FIG. 6). In such examples, the command generator 650 (FIG. 6) can identify one(s) of the IFS control measure(s) 682 (FIG. 6) based on the IFS severity level parameter(s) 678. Example instructions that can be executed to implement block 808 are described below in connection with FIG. 11.

At block 810, the IFS controller 302 determines whether IFS control measure(s) have been identified. For example, the command generator 650 can determine that there are no IFS control measure(s) to deploy in response to determining that the IFS severity level parameter(s) 678 do not indicate IFS. In other examples, the command generator 650 can determine to invoke one(s) of the actuators 402, 404 (FIGS. 4A and/or 4B) to adjust the IFS based on the IFS severity level parameter(s) 678 indicating a low, medium, or high IFS at the inlet portion 144.

If, at block 810, the IFS controller 302 determines that there are no IFS control measure(s) identified, control proceeds to block 816 to determine whether to continue monitoring the turbofan. If, at block 810, the IFS controller 302 determines that there is/are IFS control measure(s) identified, then, at block 812, the IFS controller 302 controls actuator(s) to adjust airflow contribution(s) to the inlet 144 of the turbofan 300, 400, 430. For example, the command generator 650 can transmit a command to the actuators 402, 404 to adjust positions to adjust airflow contributions from the first section 406 and/or the second section 408 to the third section 410 of FIGS. 4-5.

At block 814, the IFS controller 302 generates an alert. For example, the alert generator 660 (FIG. 6) can generate an alert including at least one of the flight data 672 (FIG. 6), the sensor data 674, one(s) of the IFS parameter(s) 676, one(s) of the IFS severity level parameter(s) 678, or deployed one(s) of the IFS control measure(s) 682. In such examples, the alert generator 660 can transmit the alert to a display for presentation to a pilot in a cockpit of an aircraft, store the alert in the database 670 (FIG. 6) for maintenance tasks or improvements to be conducted on the turbofan 300, 400, 430, etc., and/or a combination thereof.

At block 816, the IFS controller 302 determines whether to continue monitoring the turbofan. For example, the communication interface 610 (FIG. 6) can determine that the turbofan 300, 400, 430 is not in flight (e.g., an aircraft has landed on a ground surface, taxiing to a gate, parked at the gate, etc.) and, thus, determines not to continue monitoring the turbofan 300, 400, 430. In other examples, the communication interface 610 can determine to continue monitoring the turbofan 300, 400, 430 to determine if the IFS has been reduced and/or otherwise eliminated in response to the IFS control measure(s) 682 deployed at block 810.

If, at block 816, the IFS controller 302 determines to continue monitoring the turbofan, control returns to block 802 to determine the IFS parameters based on the sensor date associated with the turbofan. If, at block 816, the IFS controller 302 determines not to continue monitoring the turbofan, the machine readable instructions 800 of FIG. 8 conclude.

Figure 9:
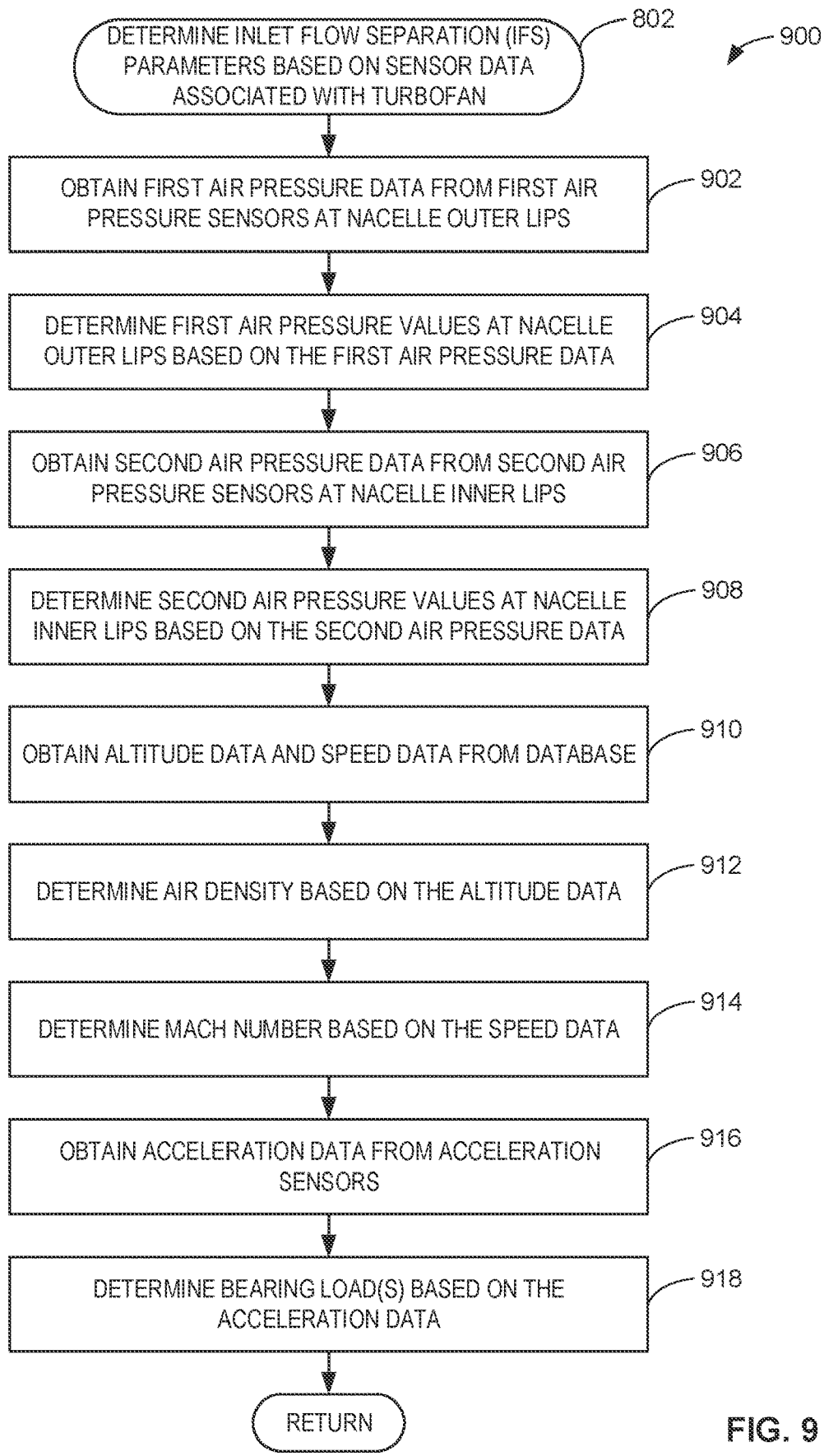
FIG. 9 is a flowchart representative of example machine readable instructions that can be executed to implement the controller of FIGS. 3-6 to determine inlet flow separation parameters based on sensor data associated with the high-bypass turbofan-type gas turbine engines of FIGS. 3-5.

FIG. 9 is a flowchart representative of example machine readable instructions 900 that can be executed to implement the IFS controller 302 of FIGS. 3-6 to determine the IFS parameters 676 of FIG. 6 based on the sensor data 674 of FIG. 6 associated with the second turbofan 300 of FIG. 3 and/or the third turbofan 400 FIGS. 4-5. The machine readable instructions 900 of FIG. 9 can be executed to implement block 802 of FIG. 8.

The machine readable instructions 900 of FIG. 9 begin at block 902, at which the IFS controller 302 obtains first air pressure data from first air pressure sensors at nacelle outer lips. For example, the communication interface 610 (FIG. 6) can obtain first air pressure data from the first pressure sensor 304 and second air pressure data from the third pressure sensor 308.

At block 904, the IFS controller 302 determines first air pressure values at the nacelle outer lips based on the first air pressure data. For example, the IFS parameter determiner 620 (FIG. 6) can determine a first air pressure value at the first outer lip 208 based on the first air pressure data and a second air pressure value at the second outer lip 212 based on the second air pressure data.

At block 906, the IFS controller 302 obtains second air pressure data from second air pressure sensors at nacelle inner lips. For example, the communication interface 610 can obtain third air pressure data from the second pressure sensor 306 and fourth air pressure data from the fourth pressure sensor 310.

At block 908, the IFS controller 302 determines second air pressure values at the nacelle inner lips based on the second air pressure data. For example, the IFS parameter determiner 620 can determine a third air pressure value at the first inner lip 210 based on the third air pressure data and a fourth air pressure value at the second inner lip 214 based on the fourth air pressure data.

At block 910, the IFS controller 302 obtains altitude data and speed data from a database. For example, the IFS parameter determiner 620 can obtain altitude data and the speed data from the flight data 672 (FIG. 6) stored in the database 670 (FIG. 6).

At block 912, the IFS controller 302 determines air density based on the altitude data. For example, the IFS parameter determiner 620 can determine the air density based on the altitude data.

At block 914, the IFS controller 302 determines a Mach number based on the speed data. For example, the IFS parameter determiner 620 can determine the Mach number based on the speed data.

At block 916, the IFS controller 302 obtains acceleration data from acceleration sensors. For example, the communication interface 610 can obtain acceleration data from one or more acceleration sensors 316, 318 coupled to one or more bearings 317, 319 of the bearing section 320 of the engine 104 of FIGS. 3-5.

At block 918, the IFS controller 302 determines bearing load(s) based on the acceleration data. For example, the IFS parameter determiner 620 can determine a first load on the first bearing 317, a second load on the second bearing 319, etc., of the engine 104 based on the acceleration data. In response to determining the bearing load(s) based on the acceleration data at block 918, control returns to block 804 of the machine readable instructions 800 of FIG. 8 to detect IFS based on the IFS parameters.

Figure 10:
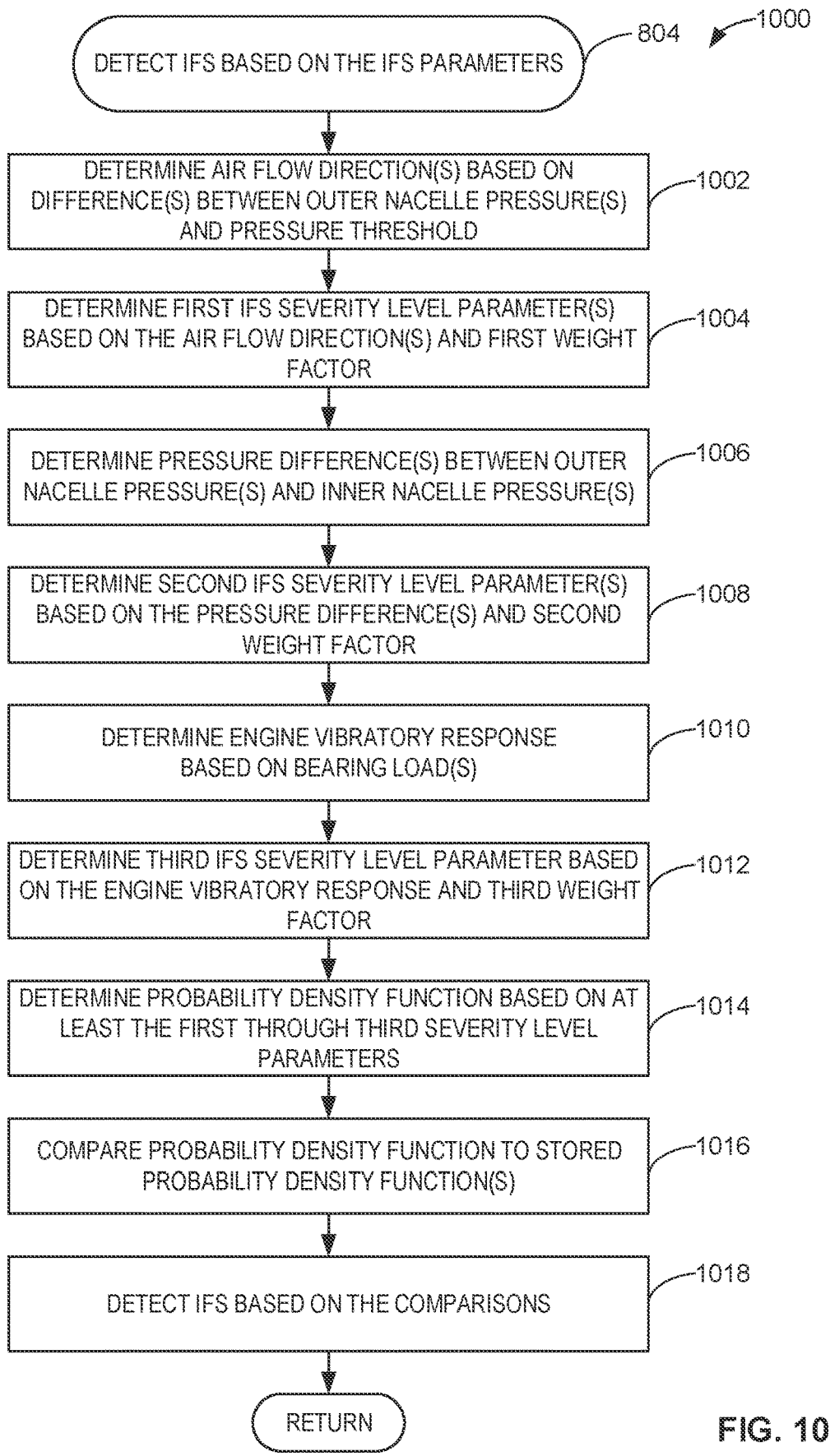
FIG. 10 is a flowchart representative of example machine readable instructions that can be executed to implement the controller of FIGS. 3-6 to detect inlet flow separation based on example inlet flow separation parameters.

FIG. 10 is a flowchart representative of example machine readable instructions 1000 that can be executed to implement the IFS controller 302 of FIGS. 3-6 to detect IFS based on the IFS parameters. The machine readable instructions 1000 of FIG. 10 can be executed to implement block 804 of FIG. 8.

The machine readable instructions 1000 of FIG. 10 begin at block 1002, at which the IFS controller 302 determines air flow direction(s) based on difference(s) between outer nacelle pressure(s) and a pressure threshold. For example, the IFS severity level parameter determiner 630 (FIG. 6) can determine a first flow direction of airflow at the first outer lip 208 based on a difference between the first pressure value from the first pressure sensor 304 and a pressure threshold. In such examples, the IFS severity level parameter determiner 630 can determine a second flow direction of airflow at the second outer lip 212 based on a difference between the second pressure value from the third pressure sensor 308 and the pressure threshold.

At block 1004, the IFS controller 302 determines first IFS severity level parameter(s) based on the air flow direction(s) and a first weight factor. For example, the IFS severity level parameter determiner 630 can determine the first IFS severity level parameter 702 (FIG. 7) associated with the first nacelle 134 based on the air flow direction at the first outer lip 208 and the first weight factor 708 (FIG. 7). In such examples, the IFS severity level parameter determiner 630 can determine the first IFS severity level parameter 702 associated with the second nacelle 135 based on the air flow direction at the second outer lip 212 and the first weight factor 708.

At block 1006, the IFS controller 302 determines pressure difference(s) between outer nacelle pressure(s) and inner nacelle pressure(s). For example, the IFS severity level parameter determiner 630 can determine a first pressure difference across surfaces of the first nacelle 134 based on a first difference between the first pressure value from the first pressure sensor 304 and the second pressure value from the second pressure sensor 306. In such examples, the IFS severity level parameter determiner 630 can determine a second pressure difference across surfaces of the second nacelle 135 based on a second difference between the third pressure value from the third pressure sensor 308 and the fourth pressure value from the fourth pressure sensor 310.

At block 1008, the IFS controller 302 determines second IFS severity level parameter(s) based on the pressure difference(s) and a second weight factor. For example, the IFS severity level parameter determiner 630 can determine the second IFS severity level parameter 704 (FIG. 7) associated with the first nacelle 134 based on the first pressure difference across at the first outer lip 208 and the first inner lip 210 and the second weight factor 710 (FIG. 7). In such examples, the IFS severity level parameter determiner 630 can determine the second IFS severity level parameter 704 associated with the second nacelle 135 based on the second pressure difference across at the second outer lip 212 and the second inner lip 214 and the second weight factor 710.

At block 1010, the IFS controller 302 determines an engine vibratory response based on bearing load(s). For example, the IFS severity level parameter determiner 630 can determine the third IFS severity level parameter 706 (FIG. 7) based on an engine vibratory response generated based on acceleration data from one(s) of the acceleration sensors 316, 318.

At block 1012, the IFS controller 302 determines a third IFS severity level parameter based on the engine vibratory response and a third weight factor. For example, the IFS severity level parameter determiner 630 can determine the third IFS severity level parameter 706 associated with the engine 104 based on the engine vibratory response associated with the engine 104 and the third weight factor 712 (FIG. 7).

At block 1014, the IFS controller 302 determines a probability density function based on at least the first through third severity level parameters. For example, the IFS detector 640 (FIG. 6) can determine a probability density function based on one or more of the first IFS severity level parameters 702, one or more of the second IFS severity level parameters 704, one or more of the third IFS severity level parameters, etc.

At block 1016, the IFS controller 302 compares the probability density function to stored probability density function(s). For example, the IFS detector 640 can compare the probability density function to the first probability density function 714 (FIG. 7), the second probability density function 716 (FIG. 7), and/or the third probability density function 718 (FIG. 7). In such examples, the first through third probability density functions 714, 716, 718 can be stored in the database 670 (FIG. 6) as the IFS detection model(s) 680.

At block 1018, the IFS controller 302 detects IFS based on the comparison(s). For example, the IFS detector 640 can detect and/or otherwise determine an existence or presence of IFS at the inlet 144 of FIGS. 1-5 based on the comparisons executed at block 1016. In response to detecting IFS based on the comparisons at block 1018, control returns to block 806 of the machine readable instructions 800 of FIG. 8 to determine whether IFS is detected.

Figure 11:
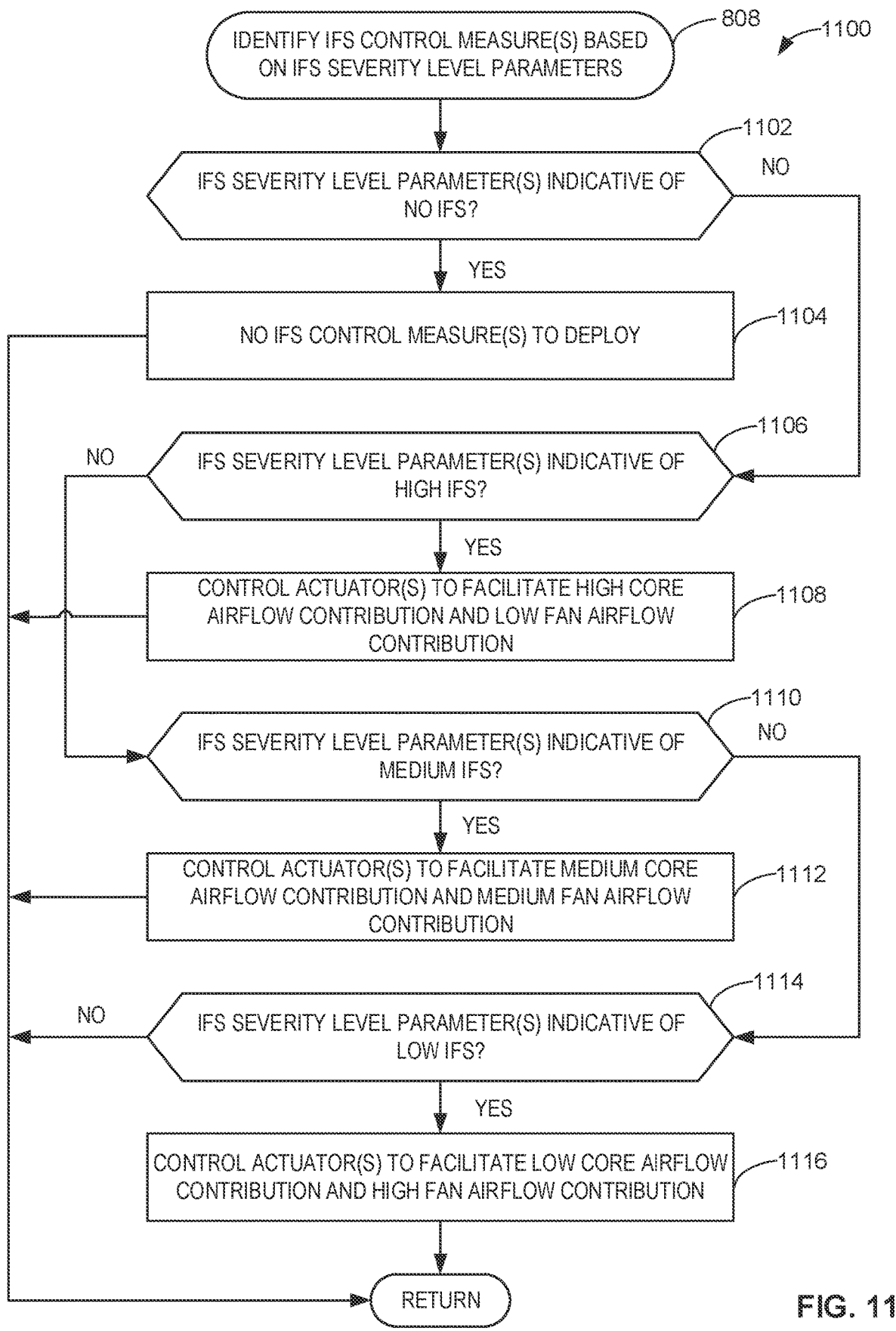
FIG. 11 is a flowchart representative of example machine readable instructions that can be executed to implement the controller of FIGS. 3-6 to identify example inlet flow separation control measure(s) based on example inlet flow separation severity level parameters.

FIG. 11 is a flowchart representative of example machine readable instructions 1100 that can be executed to implement the IFS controller 302 of FIGS. 3-6 to identify the IFS control measure(s) 682 (FIG. 6) based on the IFS severity level parameter(s) 678 (FIG. 6). The machine readable instructions 1100 of FIG. 11 can be executed to implement block 808 of FIG. 8.

The machine readable instructions 1100 of FIG. 11 begin at block 1102, at which the IFS controller 302 determines whether the IFS severity level parameter(s) are indicative of no IFS. For example, the IFS detector 640 (FIG. 6) can determine that there is no IFS at the inlet 144 based on the IFS severity level parameter(s) 678. In other examples, the IFS detector 640 can determine that there is IFS at the inlet 144 based on the IFS severity level parameter(s) 678.

If, at block 1102, the IFS controller 302 determines that the IFS severity level parameter(s) is/are indicative of no IFS, then, at block 1104, the IFS controller 302 determines that there are no IFS control measure(s) to deploy. For example, the command generator 650 (FIG. 6) can determine not to deploy one(s) of the IFS control measure(s) 682 stored in the database 670 (FIG. 6) based on the IFS severity level parameter(s) 678. In response to determining that there are no IFS control measure(s) to deploy at block 1104, control returns to block 810 of the machine readable instructions 800 of FIG. 8 to determine whether IFS control measure(s) have been identified.

If, at block 1102, the IFS controller 302 determines that the IFS severity level parameter(s) is/are not indicative of no IFS, control proceeds to block 1106 to determine whether the IFS severity level parameter(s) are indicative of high IFS. For example, the IFS detector 640 can determine that there is a substantially high IFS at the inlet 144. In such examples, the IFS detector 640 can determine that a determined probability density function based on the IFS severity level parameters 702, 704, 706 of FIG. 7 closely matches (e.g., is within a pre-defined tolerance) and/or otherwise corresponds to the third probability density function 718 (FIG. 7).

If, at block 1106, the IFS controller 302 determines that the IFS severity level parameter(s) is/are indicative of high IFS, then, at block 1108, the IFS controller 302 controls actuator(s) to facilitate high core airflow contribution and low fan airflow contribution. For example, the command generator 650 can map the detection of high IFS to the first one of the IFS control measure(s) 682 to effectuate a high airflow contribution from the first section 406 and a low airflow contribution from the second section 408 to be delivered to the third section 410. In such examples, the command generator 650 can cause the actuators 402, 404 to increase airflow from the first section 406 and decrease airflow from the second section 408. In response to controlling the actuator(s) to facilitate high core airflow contribution and low fan airflow contribution at block 1108, control returns to block 810 of the machine readable instructions 800 of FIG. 8 to determine whether IFS control measure(s) have been identified.

If, at block 1106, the IFS controller 302 determines that the IFS severity level parameter(s) is/are not indicative of high IFS, control proceeds to block 1110 to determine whether the IFS severity level parameter(s) is/are indicative of medium IFS. For example, the IFS detector 640 can determine that there is a medium level, quantity, etc., of IFS at the inlet 144. In such examples, the IFS detector 640 can determine that a determined probability density function based on the IFS severity level parameters 702, 704, 706 of FIG. 7 closely matches (e.g., is within a pre-defined tolerance) and/or otherwise corresponds to the second probability density function 716 (FIG. 7).

If, at block 1110, the IFS controller 302 determines that the IFS severity level parameter(s) is/are indicative of medium IFS, then, at block 1112, the IFS controller 302 controls actuator(s) to facilitate medium core airflow contribution and medium fan airflow contribution. For example, the command generator 650 can map the detection of medium IFS to the second one of the IFS control measure(s) 682 to effectuate a medium airflow contribution from the first section 406 and a medium airflow contribution from the second section 408 to be introduced to the third section 410. In such examples, the command generator 650 can cause the actuators 402, 404 to adjust airflow from the first section 406 (e.g., decrease from a high quantity of airflow to a medium quantity of airflow, increase from a low quantity of airflow to a medium quantity of airflow, etc.) and adjust airflow from the second section 408 (e.g., increase from a low quantity of airflow to a medium quantity of airflow, decrease from a high quantity of airflow to a medium quantity of airflow, etc.). In response to controlling the actuator(s) to facilitate medium core airflow contribution and medium fan airflow contribution at block 1112, control returns to block 810 of the machine readable instructions 800 of FIG. 8 to determine whether IFS control measure(s) have been identified.

If, at block 1110, the IFS controller 302 determines that the IFS severity level parameter(s) is/are not indicative of medium IFS, control proceeds to block 1114 to determine whether the IFS severity level parameter(s) is/are indicative of low IFS. For example, the IFS detector 640 can determine that there is a low IFS at the inlet 144. In such examples, the IFS detector 640 can determine that a determined probability density function based on the IFS severity level parameters 702, 704, 706 of FIG. 7 does not closely match (e.g., is within a pre-defined tolerance) and/or otherwise correspond to any of the probability density functions 714, 716, 718 (FIG. 7) or closely matches with a probability density function associated with low IFS.

If, at block 1114, the IFS controller 302 determines that the IFS severity level parameter(s) is/are not indicative of low IFS, control returns to block 810 of the machine readable instructions 800 of FIG. 8 to determine whether IFS control measure(s) have been identified. If, at block 1114, the IFS controller 302 determines that the IFS severity level parameter(s) is/are indicative of low IFS, then, at block 1116, the IFS controller 302 controls actuator(s) to facilitate low core airflow contribution and high fan airflow contribution. For example, the command generator 650 can map the detection of low IFS to the third one of the IFS control measure(s) 682 to cause a low airflow contribution from the first section 406 and a high airflow contribution from the second section 408 to be introduced to the third section 410. In such examples, the command generator 650 can cause the actuators 402, 404 to decrease airflow from the first section 406 and increase airflow from the second section 408. In response to controlling the actuator(s) to facilitate low core airflow contribution and high fan airflow contribution at block 1116, control returns to block 810 of the machine readable instructions 800 of FIG. 8 to determine whether IFS control measure(s) have been identified.

Figure 12:
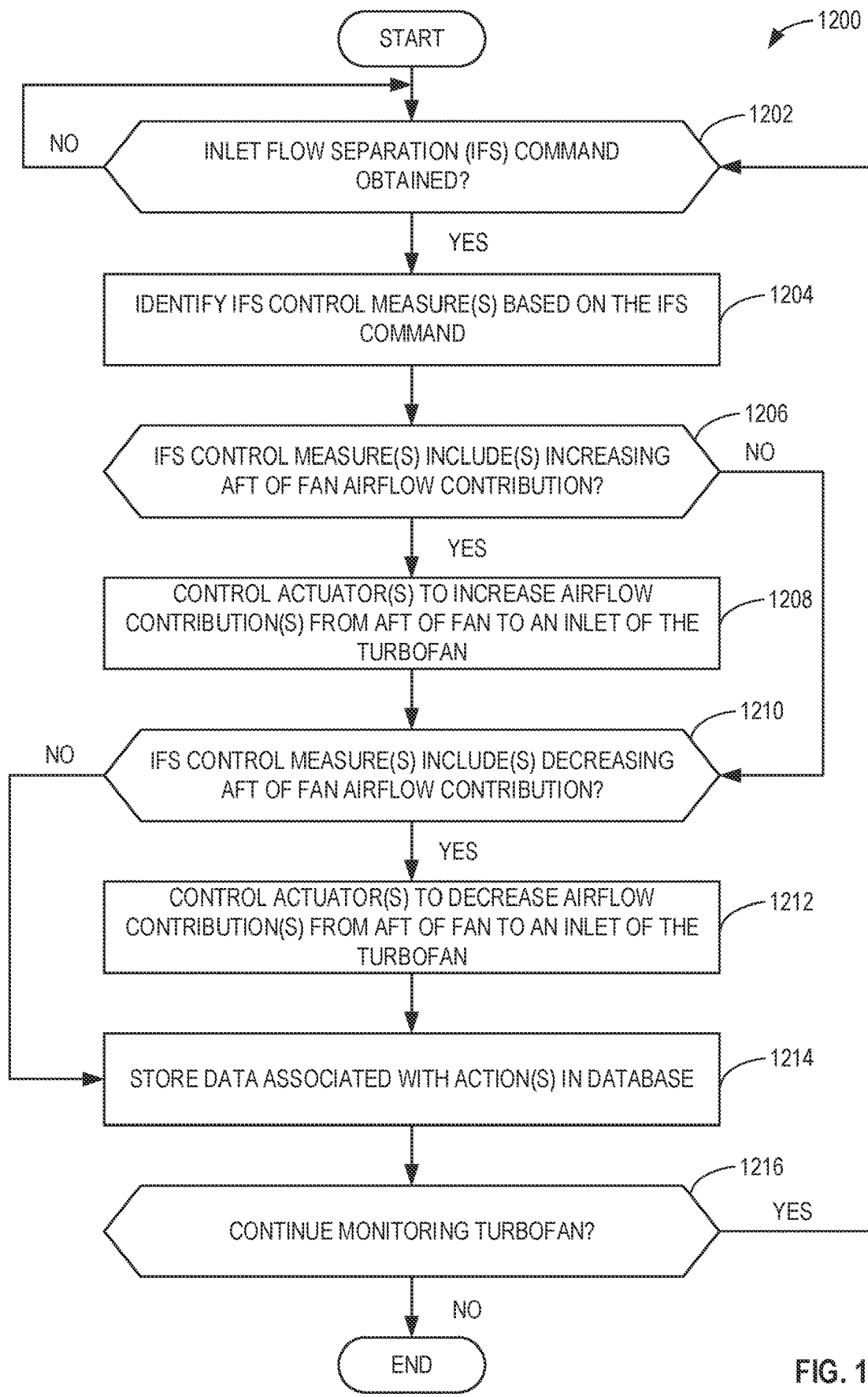
FIG. 12 is a flowchart representative of example machine readable instructions that can be executed to implement the controller of FIGS. 3-6 to adjust an airflow contribution to an inlet of the high-bypass turbofan-type gas turbine engines of FIGS. 4A, 4B, and/or 5.

FIG. 12 is a flowchart representative of example machine readable instructions 1200 that can be executed to implement the IFS controller 302 of FIGS. 3-6 to adjust an airflow contribution to an inlet of the third turbofan 400 of FIG. 4A and/or the fourth turbofan 430 of FIGS. 4B and/or 5. The machine readable instructions 1200 of FIG. 12 begin at block 1202, at which the IFS controller 302 determines whether an inlet flow separation (IFS) command has been obtained. For example, the communication interface 610 (FIG. 6) can obtain an IFS command from an aircraft coupled to the third turbofan 400 of FIG. 4A, a pilot controlling the aircraft from a cockpit of the aircraft, etc. In such examples, the IFS command can be to increase an airflow contribution from the first section 406 or the second section 408 to the third section 410. In other examples, the IFS command can be to decrease an airflow contribution from the first section 406 or the second section 408 to the third section 410.

If, at block 1202, the IFS controller 302 determines that an IFS command has not been obtained, control waits at block 1202 for an IFS command. If, at block 1202, the IFS controller 302 determines that the IFS command has been obtained, control proceeds to block 1204 to identify IFS control measure(s) based on the IFS command. For example, the command generator 650 (FIG. 6) can map the command to one(s) of the IFS control measure(s) 682 (FIG. 6) to determine one or more action(s) to execute.

At block 1206, the IFS controller 302 determines whether the IFS control measure(s) include(s) increasing aft of fan airflow contribution. For example, the command generator 650 can determine that the IFS control measure(s) 682 based on the IFS command includes controlling one(s) of the actuators 402, 404 to increase an airflow contribution from the second section 408 to the third section 410.

If, at block 1206, the IFS controller 302 determines that the IFS control measure(s) do not include increasing aft of fan airflow contribution, control proceeds to block 1210 to determine whether the IFS control measure(s) include(s) decreasing aft of fan airflow contribution. If, at block 1206, the IFS controller 302 determines that the IFS control measure(s) include(s) increasing aft of fan airflow contribution, then, at block 1208, the IFS controller 302 controls actuator(s) to increase airflow contribution(s) from aft of the fan to an inlet of the turbofan. For example, the command generator 650 (FIG. 6) can transmit a command to the first actuator 402 and/or the second actuator 404 to facilitate an increase in airflow from the second section 408 to the third section 410.

At block 1210, the IFS controller 302 determines whether the IFS control measure(s) include(s) decreasing aft of fan airflow contribution. For example, the command generator 650 can determine that the IFS control measure(s) 682 based on the IFS command includes controlling one(s) of the actuators 402, 404 to decrease an airflow contribution from the second section 408 to the third section 410.

If, at block 1210, the IFS controller 302 determines that the IFS control measure(s) do not include decreasing aft of fan airflow contribution, control proceeds to block 1214 to store data associated with action(s) in a database. If, at block 1210, the IFS controller 302 determines that the IFS control measure(s) include(s) decreasing aft of fan airflow contribution, then, at block 1212, the IFS controller 302 controls actuator(s) to decrease airflow contribution(s) from aft of the fan to an inlet of the turbofan. For example, the command generator 650 can transmit a command to the first actuator 402 and/or the second actuator 404 to facilitate a decrease in airflow from the second section 408 to the third section 410.

At block 1214, the IFS controller 302 stores data associated with action(s) in a database. For example, the alert generator 660 (FIG. 6) can record and/or otherwise store the flight data 672 (FIG. 6) and/or the sensor data 674 (FIG. 6) associated with time(s) before, during, and/or after actuation(s) of the first actuator 402 and/or the second actuator 404 in the database 670 (FIG. 6). In such examples, the alert generator 660 can record which one(s) of the actuators 402, 404 are invoked in response to the IFS command, position(s) of one(s) of the actuators 402, 404, etc., and/or a combination thereof.

At block 1216, the IFS controller 302 determines whether to continue monitoring the turbofan. If, at block 1216, the IFS controller 302 determines to continue monitoring the turbofan, control returns to block 1202 to determine whether another IFS command has been obtained. If, at block 1216, the IFS controller 302 determines not to continue monitoring the turbofan, the machine readable instructions 1200 of FIG. 12 conclude.

Figure 13:
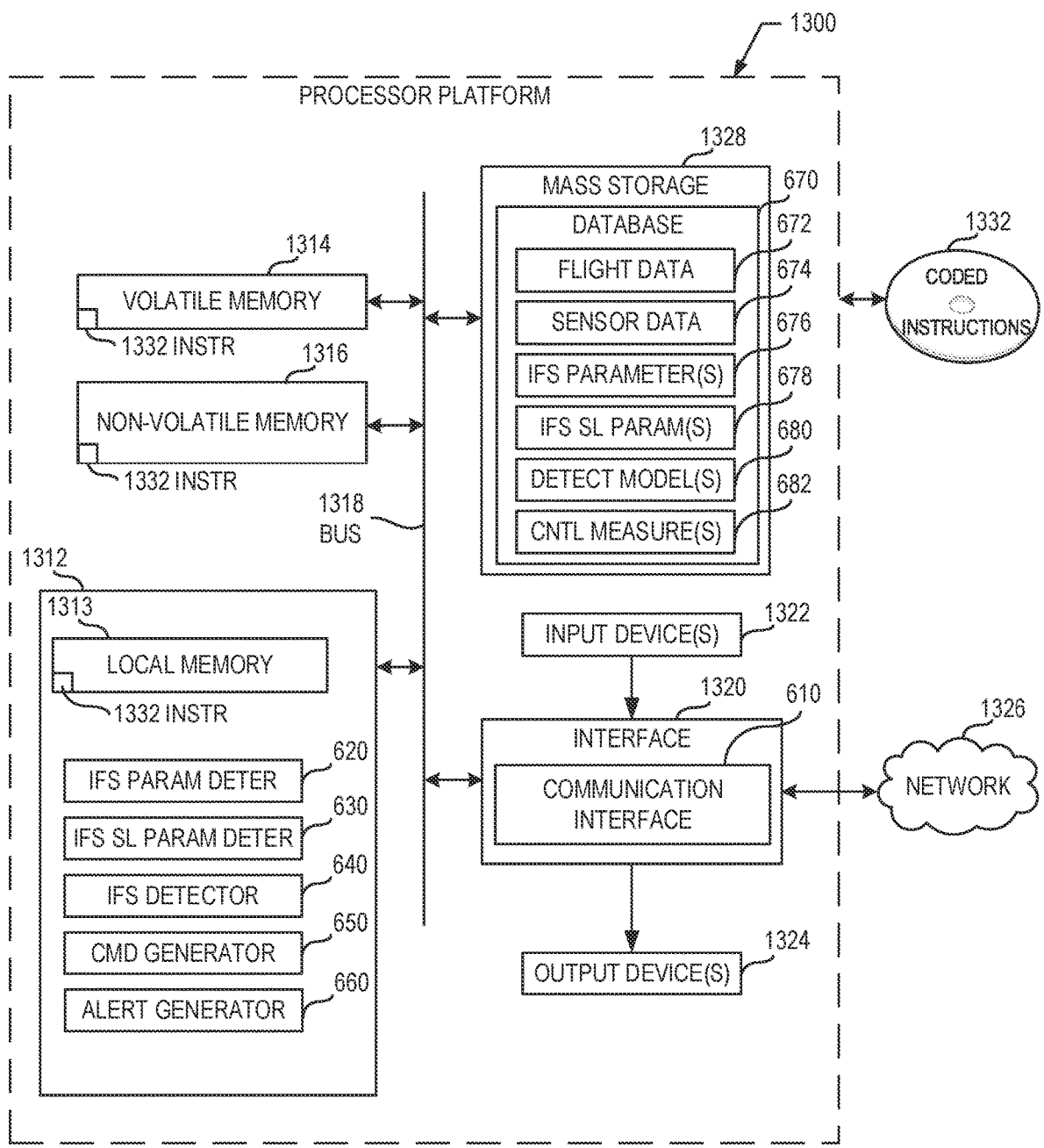
FIG. 13 is a block diagram of an example processing platform structured to execute the machine readable instructions of FIGS. 8-12 to implement the controller of FIGS. 3-6.

FIG. 13 is a block diagram of an example processor platform 1300 structured to execute the instructions of FIGS. 8-12 to implement the IFS controller 302 of FIGS. 3-6. The processor platform 1300 can be, for example, an electronic control unit (ECU), an electronic engine control (EEC) unit, a full-authority digital engine control (FADEC) unit, a self-learning machine (e.g., a neural network), or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor can be a semiconductor based (e.g., silicon based) device. In this example, the processor 1312 implements the IFS parameter determiner 620, the IFS severity level parameter determiner 630, the IFS detector 640, the command generator 650, and the alert generator 660 of FIG. 6. In FIG. 13, the IFS parameter determiner 620 is depicted as "IFS PARAM DETER," the IFS severity level parameter determiner 630 is depicted as "IFS SL PARAM DETER," and the command generator 650 is depicted as "CMD GENERATOR" 650.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 can be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 can be implemented by flash memory and/or any other desired type of memory device. Access to the main memory 1314, 1316 is controlled by a memory controller.

The processor platform 1300 of the illustrated example also includes an interface circuit 1320. The interface circuit 1320 can be implemented by any type of interface standard, such as an Ethernet interface, a universal serial bus (USB), a Bluetooth® interface, a near field communication (NFC) interface, and/or a PCI express interface. In this example, the interface circuit 1320 implements the communication interface 610 of FIG. 6.

In the illustrated example, one or more input devices 1322 are connected to the interface circuit 1320. The input device(s) 1322 permit(s) a user to enter data and/or commands into the processor 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives. In this example, the one or more mass storage devices 1328 implement the database 670, the flight data 672, the sensor data 674, the IFS parameter(s) 676, the IFS severity level parameter(s) 678, the IFS detection model(s) 680, and the IFS control measure(s) 682 of FIG. 6. In FIG. 13, the IFS severity level parameter(s) 678 are depicted as "IFS SL PARAM(S)," the IFS detection model(s) 680 are depicted as "DETECT MODEL(S)," and the IFS control measure(s) 682 are depicted as "CNTL MEASURE(S)."

The machine executable instructions 1332 of FIGS. 8-12 can be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus, and articles of manufacture have been disclosed that detect and/or control air flow separation of an engine. The example methods, apparatus, and articles of manufacture determine IFS parameters based on flight data, sensor data, etc., and can determine IFS severity level parameters based on the IFS parameters. The example methods, apparatus, and articles of manufacture can detect IFS and/or a quantification and/or severity of the IFS based on the IFS parameters, the IFS severity level parameters, etc. The example methods, apparatus, and articles of manufacture can control one or more actuators to adjust airflow bleeds to an inlet section of the engine based on the IFS detection. Advantageously, the example methods, apparatus, and articles of manufacture can improve the reliability and/or operating lifetime of component(s) of the engine and/or, more generally, the engine, by detecting IFS and reducing and/or otherwise eliminating IFS in response to the detection.

The disclosed methods, apparatus, and articles of manufacture improve the efficiency of using a computing device, such as an ECU, a FADEC, etc., by pre-processing data such as IFS parameters, IFS severity level parameters, etc., prior to detecting IFS. Advantageously, by pre-processing the data, the disclosed methods, apparatus, and articles of manufacture can detect IFS using reduced computing resources compared to detecting IFS using non-processed data. The disclosed methods, apparatus and articles of manufacture are accordingly directed to one or more improvement(s) in the functioning of a computer.

Further aspects of the invention are provided by the subject matter of the following clauses:

1. An apparatus comprising hardware, and memory including instructions that, when executed, cause the hardware to at least determine an inlet flow separation parameter based on a first pressure value from a first pressure sensor included in a nacelle of a turbofan and a second pressure value from a second pressure sensor included in the nacelle, determine a severity level parameter based on the inlet flow separation parameter, the severity level parameter based on a difference between the first pressure value and the second pressure value, and adjust a contribution of airflow from aft of a fan of the turbofan based on the severity level parameter.

2. The apparatus of any preceding clause wherein the first pressure sensor is coupled to an outer lip of the nacelle, the severity level parameter is a first severity level parameter, and the hardware to determine an airflow direction at the outer lip based on a difference between the first pressure value and a threshold, determine a second severity level parameter based on the difference and a weight value, and detect inlet flow separation at an inlet of turbofan based on the first severity level parameter and the second severity level parameter.

3. The apparatus of any preceding clause wherein the hardware is to determine a first probability density function based on the first severity level parameter and the second severity level parameter, compare the first probability density function to a second probability density function stored in a database, and detect the inlet flow separation at the inlet of the turbofan based on the comparison.

4. The apparatus of any preceding clause wherein the first pressure sensor is coupled to an outer lip of the nacelle, the second pressure sensor is coupled to an inner lip of the nacelle, the severity level parameter corresponding to a nacelle inlet pressure difference, and the hardware to determine the nacelle inlet pressure difference based on a difference between the first pressure value and the second pressure value, determine the severity level parameter based on the nacelle inlet pressure difference and a weight value, and detect inlet flow separation at an inlet of turbofan based on the severity level parameter.

5. The apparatus of any preceding clause wherein the severity level parameter is a first severity level parameter, and the hardware to obtain acceleration data from an accelerometer coupled to a bearing of the turbofan, determine a vibratory response of the turbofan based on the acceleration data, determine a second severity level parameter based on the vibratory response and a weight value, and detect inlet flow separation at an inlet of turbofan based on the first severity level parameter and the second severity level parameter.

6. The apparatus of any preceding clause wherein the first pressure sensor is coupled to an outer lip of the nacelle, the second pressure sensor is coupled to an inner lip of the nacelle, and the hardware to obtain altitude data and speed data from an aircraft coupled to the turbofan, determine an air density based on the altitude data, determine a Mach number based on the speed data, and determine the inlet flow separation parameter based on at least one of the first pressure value, the second pressure value, the air density, or the Mach number.

7. The apparatus of any preceding clause wherein the hardware is to adjust the contribution of airflow from aft of the fan by controlling an actuator included in the nacelle based on the severity level parameter, the actuator to move from a first position to a second position to adjust the contribution of the airflow from aft of the fan to forward of the fan.

8. An apparatus comprising an inlet flow separation parameter determiner to determine an inlet flow separation parameter based on a first pressure value from a first pressure sensor included in a nacelle of a turbofan and a second pressure value from a second pressure sensor included in the nacelle, an inlet flow separation severity level parameter determiner to determine a severity level parameter based on the inlet flow separation parameter, the severity level parameter based on a difference between the first pressure value and the second pressure value, and a command generator to adjust a contribution of airflow from aft of a fan of the turbofan based on the severity level parameter.

9. The apparatus of any preceding clause wherein the first pressure sensor is coupled to an outer lip of the nacelle, the severity level parameter is a first severity level parameter, the inlet flow separation severity level parameter determiner to determine an airflow direction at the outer lip based on a difference between the first pressure value and a threshold, and determine a second severity level parameter based on the difference and a weight value, and further including an inlet flow separation detector to detect inlet flow separation at an inlet of turbofan based on the first severity level parameter and the second severity level parameter.

10. The apparatus of any preceding clause wherein the inlet flow separation detector is to determine a first probability density function based on the first severity level parameter and the second severity level parameter, compare the first probability density function to a second probability density function stored in a database, and detect the inlet flow separation at the inlet of the turbofan based on the comparison.

11. The apparatus of any preceding clause wherein the first pressure sensor is coupled to an outer lip of the nacelle, the second pressure sensor is coupled to an inner lip of the nacelle, the severity level parameter corresponding to a nacelle inlet pressure difference, the inlet flow separation severity level parameter determiner to determine the nacelle inlet pressure difference based on a difference between the first pressure value and the second pressure value, determine the severity level parameter based on the nacelle inlet pressure difference and a weight value, and further including an inlet flow separation detector to detect inlet flow separation at an inlet of turbofan based on the severity level parameter.

12. The apparatus of any preceding clause wherein the severity level parameter is a first severity level parameter, further including a collection engine to obtain acceleration data from an accelerometer coupled to a bearing of the turbofan, the inlet flow separation severity level parameter determiner is to determine a vibratory response of the turbofan based on the acceleration data, determine a second severity level parameter based on the vibratory response and a weight value, and further including an inlet flow separation detector to detect inlet flow separation at an inlet of turbofan based on the first severity level parameter and the second severity level parameter.

13. The apparatus of any preceding clause wherein the first pressure sensor is coupled to an outer lip of the nacelle, the second pressure sensor is coupled to an inner lip of the nacelle, and further including a collection engine to obtain altitude data and speed data from an aircraft coupled to the turbofan, and the inlet flow separation parameter determiner to determine an air density based on the altitude data, determine a Mach number based on the speed data, and determine the inlet flow separation parameter based on at least one of the first pressure value, the second pressure value, the air density, or the Mach number.

14. The apparatus of any preceding clause wherein the command generator is to adjust the contribution of airflow from aft of the fan by controlling an actuator included in the nacelle based on the severity level parameter, the command generator to invoke the actuator to move from a first position to a second position to adjust the contribution of the airflow from aft of the fan to forward of the fan.

15. A non-transitory computer readable storage medium comprising instructions that, when executed, cause at least one processor to at least determine an inlet flow separation parameter based on a first pressure value from a first pressure sensor included in a nacelle of a turbofan and a second pressure value from a second pressure sensor included in the nacelle, determine a severity level parameter based on the inlet flow separation parameter, the severity level parameter based on a difference between the first pressure value and the second pressure value, and adjust a contribution of airflow from aft of a fan of the turbofan based on the severity level parameter.

16. The non-transitory computer readable storage medium of any preceding clause wherein the first pressure sensor is coupled to an outer lip of the nacelle, the severity level parameter is a first severity level parameter, and the instructions, when executed, cause the at least one processor to determine an airflow direction at the outer lip based on a difference between the first pressure value and a threshold, determine a second severity level parameter based on the difference and a weight value, and detect inlet flow separation at an inlet of turbofan based on the first severity level parameter and the second severity level parameter.

17. The non-transitory computer readable storage medium of any preceding clause wherein the instructions, when executed, cause the at least one processor to determine a first probability density function based on the first severity level parameter and the second severity level parameter, compare the first probability density function to a second probability density function stored in a database, and detect the inlet flow separation at the inlet of the turbofan based on the comparison.

18. The non-transitory computer readable storage medium of any preceding clause wherein the first pressure sensor is coupled to an outer lip of the nacelle, the second pressure sensor is coupled to an inner lip of the nacelle, the severity level parameter corresponding to a nacelle inlet pressure difference, and the instructions, when executed, cause the at least one processor to determine the nacelle inlet pressure difference based on a difference between the first pressure value and the second pressure value, determine the severity level parameter based on the nacelle inlet pressure difference and a weight value, and detect inlet flow separation at an inlet of turbofan based on the severity level parameter.

19. The non-transitory computer readable storage medium of any preceding clause wherein the severity level parameter is a first severity level parameter, and the instructions, when executed, cause the at least one processor to obtain acceleration data from an accelerometer coupled to a bearing of the turbofan, determine a vibratory response of the turbofan based on the acceleration data, determine a second severity level parameter based on the vibratory response and a weight value, and detect inlet flow separation at an inlet of turbofan based on the first severity level parameter and the second severity level parameter.

20. The non-transitory computer readable storage medium of any preceding clause wherein the first pressure sensor is coupled to an outer lip of the nacelle, the second pressure sensor is coupled to an inner lip of the nacelle, and the instructions, when executed, cause the at least one processor to obtain altitude data and speed data from an aircraft coupled to the turbofan, determine an air density based on the altitude data, determine a Mach number based on the speed data, and determine the inlet flow separation parameter based on at least one of the first pressure value, the second pressure value, the air density, or the Mach number.

21. The non-transitory computer readable storage medium of any preceding clause wherein the instructions, when executed, cause the at least one processor to adjust the contribution of airflow from aft of the fan by controlling an actuator included in the nacelle based on the severity level parameter, the actuator to move from a first position to a second position to adjust the contribution of the airflow from aft of the fan to forward of the fan.

22. A method comprising determining an inlet flow separation parameter based on a first pressure value from a first pressure sensor included in a nacelle of a turbofan and a second pressure value from a second pressure sensor included in the nacelle, determining a severity level parameter based on the inlet flow separation parameter, the severity level parameter based on a difference between the first pressure value and the second pressure value, and adjusting a contribution of airflow from aft of a fan of the turbofan based on the severity level parameter.

23. The method of any preceding clause wherein the first pressure sensor is coupled to an outer lip of the nacelle, the severity level parameter is a first severity level parameter, and further including determining an airflow direction at the outer lip based on a difference between the first pressure value and a threshold, determining a second severity level parameter based on the difference and a weight value, and detecting inlet flow separation at an inlet of turbofan based on the first severity level parameter and the second severity level parameter.

24. The method of any preceding clause further including determining a first probability density function based on the first severity level parameter and the second severity level parameter, comparing the first probability density function to a second probability density function stored in a database, and detecting the inlet flow separation at the inlet of the turbofan based on the comparison.

25. The method of any preceding clause wherein the first pressure sensor is coupled to an outer lip of the nacelle, the second pressure sensor is coupled to an inner lip of the nacelle, the severity level parameter corresponding to a nacelle inlet pressure difference, and further including determining the nacelle inlet pressure difference based on a difference between the first pressure value and the second pressure value, determining the severity level parameter based on the nacelle inlet pressure difference and a weight value, and detecting inlet flow separation at an inlet of turbofan based on the severity level parameter.

26. The method of any preceding clause wherein the severity level parameter is a first severity level parameter, and further including obtaining acceleration data from an accelerometer coupled to a bearing of the turbofan, determining a vibratory response of the turbofan based on the acceleration data, determining a second severity level parameter based on the vibratory response and a weight value, and detecting inlet flow separation at an inlet of turbofan based on the first severity level parameter and the second severity level parameter.

27. The method of any preceding clause wherein the first pressure sensor is coupled to an outer lip of the nacelle, the second pressure sensor is coupled to an inner lip of the nacelle, and further including obtaining altitude data and speed data from an aircraft coupled to the turbofan, determining an air density based on the altitude data, determining a Mach number based on the speed data, and determining the inlet flow separation parameter based on at least one of the first pressure value, the second pressure value, the air density, or the Mach number.

28. The method of any preceding clause wherein adjusting the contribution of airflow from aft of the fan includes controlling an actuator included in the nacelle based on the severity level parameter, the actuator to move from a first position to a second position to adjust the contribution of the airflow from aft of the fan to forward of the fan.

29. An apparatus comprising hardware, and memory including instructions that, when executed, cause the hardware to at least determine an inlet flow separation parameter based on a first pressure value from a first pressure sensor included in a nacelle of a turbofan and a second pressure value from a second pressure sensor included in the nacelle, and determine a severity level parameter based on the inlet flow separation parameter, the severity level parameter based on a difference between the first pressure value and the second pressure value.

30. The apparatus of any preceding clause wherein the hardware is to adjust a contribution of airflow from aft of a fan of the turbofan based on the severity level parameter.

31. The apparatus of any preceding clause the first pressure sensor is coupled to an outer lip of the nacelle, the severity level parameter is a first severity level parameter, and the hardware to determine an airflow direction at the outer lip based on a difference between the first pressure value and a threshold, determine a second severity level parameter based on the difference and a weight value, and detect inlet flow separation at an inlet of turbofan based on the first severity level parameter and the second severity level parameter.

32. The apparatus of any preceding clause wherein the hardware is to determine a first probability density function based on the first severity level parameter and the second severity level parameter, compare the first probability density function to a second probability density function stored in a database, and detect the inlet flow separation at the inlet of the turbofan based on the comparison.

33. The apparatus of any preceding clause wherein the first pressure sensor is coupled to an outer lip of the nacelle, the second pressure sensor is coupled to an inner lip of the nacelle, the severity level parameter corresponding to a nacelle inlet pressure difference, and the hardware to determine the nacelle inlet pressure difference based on a difference between the first pressure value and the second pressure value, determine the severity level parameter based on the nacelle inlet pressure difference and a weight value, and detect inlet flow separation at an inlet of turbofan based on the severity level parameter.

34. The apparatus of any preceding clause wherein the severity level parameter is a first severity level parameter, and the hardware to obtain acceleration data from an accelerometer coupled to a bearing of the turbofan, determine a vibratory response of the turbofan based on the acceleration data, determine a second severity level parameter based on the vibratory response and a weight value, and detect inlet flow separation at an inlet of turbofan based on the first severity level parameter and the second severity level parameter.

35. The apparatus of any preceding clause wherein the first pressure sensor is coupled to an outer lip of the nacelle, the second pressure sensor is coupled to an inner lip of the nacelle, and the hardware to obtain altitude data and speed data from an aircraft coupled to the turbofan, determine an air density based on the altitude data, determine a Mach number based on the speed data, and determine the inlet flow separation parameter based on at least one of the first pressure value, the second pressure value, the air density, or the Mach number.

36. The apparatus of any preceding clause wherein the hardware is to adjust a contribution of airflow from aft of the fan by controlling an actuator included in the nacelle based on the severity level parameter, the actuator to move from a first position to a second position to adjust the contribution of the airflow from aft of the fan to forward of the fan.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A turbine engine comprising:
   a fan;
   a nacelle circumscribing at least the fan;
   a compressor section downstream of the fan;
   a conduit defined, at least in part, by the nacelle, wherein the conduit comprises:
      a first opening at the compressor section;
      a second opening downstream of the fan and upstream of the compressor section; and
      a third opening upstream of the fan;
   a first pressure sensor located at an outer lip of the nacelle;
   a second pressure sensor coupled to the nacelle and spaced from the first pressure sensor; and
   at least one actuator communicatively coupled to the first pressure sensor and the second pressure sensor, the at least one actuator located in the conduit and configured to adjust airflow between the first opening and the third opening, and between the second opening and the third opening, wherein the first pressure sensor and the second pressure sensor provide outputs for generating commands that control the at least one actuator.

2. The turbine engine of claim 1, further comprising a controller for generating the commands, the controller in communication with the first pressure sensor, the second pressure sensor, and the at least one actuator.

3. The turbine engine of claim 2, further comprising at least one antenna, wherein communication between the controller, the first pressure sensor, the second pressure sensor, and the at least one actuator is via the at least one antenna.

4. The turbine engine of claim 3, wherein the at least one actuator is multiple actuators circumferentially spaced from each other and annularly arranged within the nacelle.

5. The turbine engine of claim 1, wherein the first opening in the nacelle is between a low pressure compressor and a high pressure compressor of the compressor section.

6. The turbine engine of claim 1, wherein the second pressure sensor is located at an inner lip of the nacelle.

7. The turbine engine of claim 6, wherein the third opening in the nacelle is downstream of the second pressure sensor.

8. The turbine engine of claim 7, further comprising a third pressure sensor coupled to the outer lip and circumferentially spaced from the first pressure sensor.

9. The turbine engine of claim 8, further comprising a fourth pressure sensor coupled to the inner lip and circumferentially spaced from the second pressure sensor.

10. The turbine engine of claim 9, further comprising a controller in communication with the first pressure sensor, the second pressure sensor, the third pressure sensor, the fourth pressure sensor, and the at least one actuator.

11. The turbine engine of claim 10, wherein the first pressure sensor, the second pressure sensor, the third pressure sensor, and the fourth pressure sensor are wireless pressure sensors, wireless piezoelectric pressure sensors, or wireless passive piezoelectric pressure sensors.

12. The turbine engine of claim 10, wherein the controller, based on input from the first pressure sensor and the second pressure sensor or the third pressure sensor and the fourth pressure sensor, actuates the at least one actuator to allow the airflow into the conduit from the first opening and the second opening, where the airflow is exhausted from the conduit at the third opening upstream of the fan.

13. The turbine engine of claim 12, wherein the airflow provided at the third opening has a high quantity of air from the first opening and a low quantity of air from the second opening, indicative of a first position of the at least one actuator.

14. The turbine engine of claim 12, wherein the airflow provided at the third opening has a medium quantity of air from the first opening and a medium quantity of air from the second opening, indicative of a second position of the at least one actuator.

15. The turbine engine of claim 12, wherein the airflow provided at the third opening has a low quantity of air from the first opening and a high quantity of air from the second opening, indicative of a third position of the at least one actuator.

16. The turbine engine of claim 12, wherein the airflow exhausted at the third opening is at an angle relative to air received at an inlet portion of the nacelle.

17. The turbine engine of claim 1, wherein the first opening is at a tubular outer casing circumscribing at least the compressor section, wherein the tubular outer casing is circumscribed by and spaced from the nacelle.

18. The turbine engine of claim 17, wherein the second opening and the third opening are located at an inner lip of the nacelle.

19. The turbine engine of claim 18, wherein the second opening and the third opening are asymmetric about the fan.

20. A turbine engine comprising:
   a fan;
   a nacelle circumscribing at least the fan;
   a compressor section downstream of the fan;
   at least two conduits defined, at least in part, by at least two portions of the nacelle, wherein each of the at least two conduits comprise:
      a first opening at the compressor section;
      a second opening downstream of the fan and upstream of the compressor section; and
      a third opening upstream of the fan;
   first pressure sensors coupled to the nacelle;
   second pressure sensors coupled to the nacelle and spaced from the first pressure sensors; and
   at least two actuators communicatively coupled to the first pressure sensors and the second pressure sensors, wherein each actuator of the at least two actuators are located in each conduit of the at least two conduits and configured to adjust airflow between the first opening and the third opening, and adjust airflow between the second opening and the third opening, wherein the first pressure sensors and the second pressure sensors provide outputs for generating commands that control the at least two actuators.

* * * * *